(12) United States Patent
Bakker et al.

(10) Patent No.: US 12,101,174 B2
(45) Date of Patent: *Sep. 24, 2024

(54) ENABLING SINGLE RADIO VOICE CALL CONTINUITY (SRVCC) IN A SECOND ACCESS WHEN A USER EQUIPMENT (UE) IS USING A FIRST ACCESS

(71) Applicant: BlackBerry Limited, Waterloo (CA)

(72) Inventors: Jan Hendrik Lucas Bakker, Fort Worth, TX (US); Nicholas James Russell, Newbury (GB)

(73) Assignee: BlackBerry Limited, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/461,786

(22) Filed: Sep. 6, 2023

(65) Prior Publication Data
US 2024/0089806 A1 Mar. 14, 2024

Related U.S. Application Data

(63) Continuation of application No. 16/900,403, filed on Jun. 12, 2020, now Pat. No. 11,785,508.

(Continued)

(51) Int. Cl.
*H04L 9/08* (2006.01)
*H04L 65/1016* (2022.01)
(Continued)

(52) U.S. Cl.
CPC ...... *H04L 65/1083* (2013.01); *H04L 65/1016* (2013.01); *H04L 65/1063* (2013.01);
(Continued)

(58) Field of Classification Search
CPC ............... H04W 40/36; H04L 65/1006; H04L 65/1046; H04L 61/3085; H04L 65/1073; H04L 65/1063; H04L 60/005
(Continued)

(56) References Cited

U.S. PATENT DOCUMENTS 9,532,276 B1 12/2016 Malhotra et al.
2013/0028179 A1 1/2013 Sedlacek et al.
(Continued)

FOREIGN PATENT DOCUMENTS

CN 110036664 7/2019
EP 2603040 A1 6/2013
(Continued)

OTHER PUBLICATIONS

WIPO: International Search Report and Written Opinion relating to application PCT/EP2020/078876, dated Jan. 14, 2021.
(Continued)

*Primary Examiner* — Marcus Smith
*Assistant Examiner* — Jason A Harley
(74) *Attorney, Agent, or Firm* — Rowand LLP

(57) ABSTRACT

A server-implemented method is disclosed. The method includes: receiving a request from an IP Multimedia Subsystem (IMS) network node of an IMS network; and in response to receiving the request, providing NAS registration state information associated with a user equipment (UE) to the IMS network node, the NAS registration state information indicating at least one of fourth-generation (4G) single radio voice call continuity (SRVCC) capability of the UE or fifth-generation (5G) SRVCC capability of the UE that is applicable when using an access network supported by a core network, wherein the server is configured to store separate instances of UE SRVCC capabilities, the separate instances including indications of at least one of 4G UE SRVCC capability or 5G UE SRVCC capability that is applicable when using the access network supported by the core network, and wherein the UE is registered with the IMS network using a session initiation protocol (SIP) via the access network.

20 Claims, 7 Drawing Sheets

Related U.S. Application Data

(60) Provisional application No. 62/928,663, filed on Oct. 31, 2019.

(51) Int. Cl.
| | |
|---|---|
| *H04L 65/1045* | (2022.01) |
| *H04L 65/1063* | (2022.01) |
| *H04L 65/1073* | (2022.01) |
| *H04L 65/1083* | (2022.01) |
| *H04L 65/1104* | (2022.01) |
| *H04W 8/04* | (2009.01) |
| *H04W 12/0433* | (2021.01) |
| *H04W 36/00* | (2009.01) |
| *H04W 60/00* | (2009.01) |
| *H04W 60/04* | (2009.01) |
| *H04W 76/10* | (2018.01) |
| *H04W 80/10* | (2009.01) |

(52) U.S. Cl.
CPC ...... *H04L 65/1073* (2013.01); *H04L 65/1104* (2022.05); *H04W 36/00226* (2023.05)

(58) Field of Classification Search
USPC ........................................ 370/331; 455/435.1
See application file for complete search history.

(56) References Cited

U.S. PATENT DOCUMENTS

| | | | |
|---|---|---|---|
| 2016/0021579 A1 | 1/2016 | Mufti | |
| 2019/0059024 A1* | 2/2019 | Mufti | ................... H04W 48/02 |
| 2019/0297538 A1* | 9/2019 | Keller | ............. H04W 36/00226 |
| 2019/0394245 A1 | 12/2019 | Niemi | |
| 2020/0305033 A1* | 9/2020 | Keller | ............. H04W 36/00226 |

FOREIGN PATENT DOCUMENTS

| | | |
|---|---|---|
| EP | 2993925 A1 | 3/2016 |
| WO | 2019117769 | 6/2019 |

OTHER PUBLICATIONS

Blackberry UK Ltd.: "Completing introducing of 5G SRVCC", 3GPP Draft; C1-194021-24237-G10-5G-SRVCC, 3rd Generation Partnership Project (3GPP), Mobile Competence Centre; 650, Route Des Lucioles; F-06921 Sophia-Antipolis Cedex; France, vol. CT WG1, No. Wroclaw (Poland); XP051762688 Aug. 18, 2019.

Unknown: "3rd Generation Partnership Project; Technical Specification Group Core Network and Terminals; IP Multimedia (IM) Core Network (CN) subsystem IP Multimedia Subsystem (IMS) Service Continuity; Stage 3 (Release 16)", 3GPP Standard; Technical Specification; 3GPP Ts 24.237, 3rd Generation Partnership Project (3GPP), Mobile Competence Centre; 650, Route Des Lucioles; F-06921 Sophia-Antipolis Cedex; France, vol. CT WG1, No. V16.1.0, XP051722894, Mar. 26, 2019.

Ericsson et al.: "SRVCC from E-UTRAN to GERAN/UTRAN when IMS voice call is initiated in 5GS and support of scenario where the SCC AS sends a request to the HSS to retrieve the SRVCC data for the UE using SBA", 3GPP Draft; C1-203782, 3rd Generation Partnership Project (3GPP), Mobile Competence Centre; 650, Route Des Lucioles; F-06921 Sophia-Antipolis Cedex; France, vol. CT WG1, No. Electronic meeting; XP051893108, Jun. 3, 2020.

Ericsson et al.: "Completion of SRVCC data" 3GPP Draft; C4-200580, 3rd Generation Partnership Project (3GPP), Mobile Competence Centre; 650, Route Des Lucioles; F-06921 Sophia-Antipolis Cedex; France, vol. CT WG4, No. E-Meeting, XP051847375, Feb. 14, 2020.

Chinese Application No. 202080075650.6, Office Action dated Jun. 22, 2023.

3GPP TSG-CT WG1 Meeting #119; Wroclaw (Pland), Aug. 26-30, 2019.

Chinese Application No. 2020800756506, Search Report dated Oct. 14, 2020.

CA Office Action dated Oct. 12, 2023; Canadian Application No. 3,150,833.

* cited by examiner

ENABLING SINGLE RADIO VOICE CALL CONTINUITY (SRVCC) IN A SECOND ACCESS WHEN A USER EQUIPMENT (UE) IS USING A FIRST ACCESS

CROSS-REFERENCE TO RELATED APPLICATIONS

The present application claims priority to U.S. Provisional Patent Application No. 62/928,663 filed on Oct. 31, 2019, and U.S. patent application Ser. No. 16/900,403 filed on Jun. 12, 2020, the contents of which are herein incorporated by reference in their entirety.

TECHNICAL FIELD

The present disclosure relates to mobile communication systems and, in particular, to techniques for transferring sessions between different types of mobile communication systems.

BACKGROUND

In a packet-switched (PS) domain, a communication session, such as a voice call, is handled using packet switching communication techniques. Voice data is carried via data packets, and the corresponding voice call is established using signaling for the PS domain. In contrast, in the circuit-switched (CS) domain, a communication session is established using dedicated circuits or communication channels through a CS network, and the corresponding voice call is established using signaling in the CS domain.

As a user equipment (UE) moves across different networks, it is desired to preserve service continuity while maintaining a promised quality of service (QoS). Various handover techniques for transferring calls or data sessions are known. With the development of 5G, the fifth-generation cellular network technology, there is a need for solutions which optimize handover of sessions from PS-based systems to legacy CS domains.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
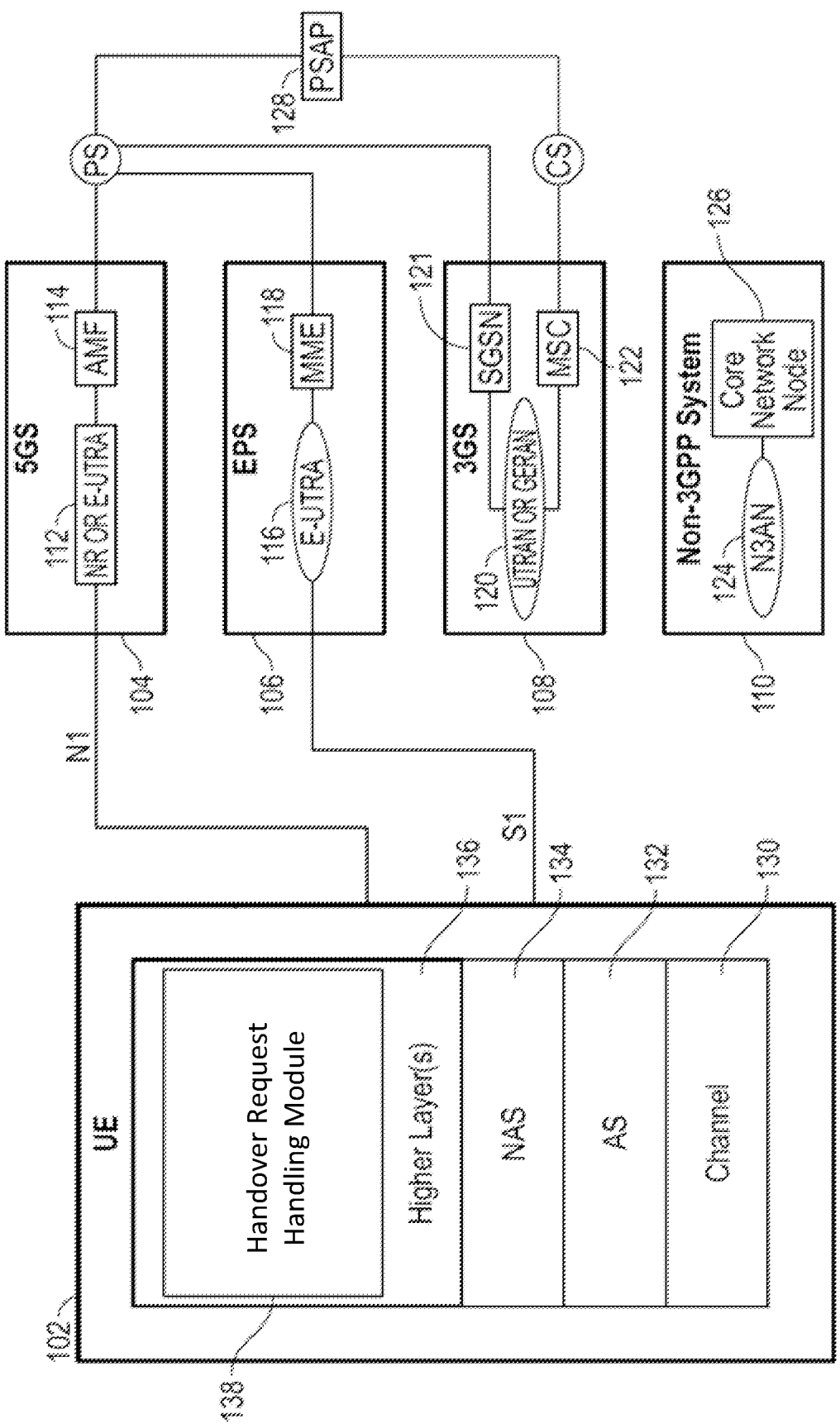
FIG. 1 is a block diagram of an example communication arrangement that includes different types of mobile communication systems, for supporting session handovers, in accordance with example embodiments of the present disclosure.

In an aspect, a server-implemented method is disclosed. The method includes: receiving a communication from a network node of an IP Multimedia Subsystem (IMS) network; and in response to receiving the communication, providing registration state information associated with a user equipment (UE) to the network node, the registration state information indicating at least one of 4G UE single radio voice call continuity (SRVCC) capability or 5G UE SRVCC capability for the UE, wherein the server is configured to store separate instances of UE SRVCC capabilities, the separate instances including indications of at least one of 4G UE SRVCC capability or 5G UE SRVCC capability, and wherein the UE is registered with the IMS network using a session initiation protocol (SIP) via an access network.

In some implementations, the registration state information may indicate both 4G UE SRVCC capability and 5G UE SRVCC capability.

In some implementations, the access network may comprise a network supported by a 3rd Generation Partnership Project (3GPP) core network.

In some implementations, the access network may comprise a Next Generation Radio Access Network (NG-RAN) supported by a 5G core network.

In some implementations, the access network may comprise an Evolved Universal Mobile Telecommunications System (UMTS) Terrestrial Radio Access supported by an Evolved Packet Core (EPC) network.

In some implementations, the network node may comprise an IMS service centralization and continuity application server (SCC AS).

In some implementations, the registration state information may be provided via a Sh interface associated with the IMS network node.

In another aspect, a method implemented by a network node is disclosed. The method includes: obtaining registration state information associated with a user equipment (UE) from a first core network node, the registration state information indicating at least one of 4G UE single radio voice call continuity (SRVCC) capability or 5G UE SRVCC capability for the UE, wherein the UE is registered with a first IMS network that includes the network node using a session initiation protocol (SIP) via an access network supported by a second core network; and providing, to a second IMS network node, an indication of a single UE SRVCC capability for the UE.

In some implementations, the first core network node may comprise a home subscriber server (HSS).

In some implementations, the second core network may comprise a 5G core network.

In some implementations, the network node may comprise an IMS service centralization and continuity application server (SCC AS).

In some implementations, the second IMS network node may comprise an access transfer control function (ATCF) node.

In some implementations, the second IMS network may include the second IMS network node.

In some implementations, providing the indication of a single UE SRVCC capability for the UE may include sending, to the second IMS network node, a SIP message request containing SRVCC information.

In another aspect, a computing device implementing a network node is disclosed. The computing device includes a processor and a memory coupled to the processor. The memory stores instructions that, when executed, configure the processor to: obtain registration state information associated with a user equipment (UE) from a first core network node, the registration state information indicating at least one of 4G UE single radio voice call continuity (SRVCC) capability or 5G UE SRVCC capability for the UE, wherein the UE is registered with a first IMS network that includes the network node using a session initiation protocol (SIP) via an access network supported by a second core network; and provide, to a second IMS network node, an indication of a single UE SRVCC capability for the UE.

Other example embodiments of the present disclosure will be apparent to those of ordinary skill in the art from a review of the following detailed descriptions in conjunction with the drawings.

The Evolved Packet Core (EPC) is a fourth generation (4G) or Long-Term Evolution (LTE) core network and it is part of an Internet Protocol Connectivity Access Network (IP-CAN) supporting the Internet Protocol Multimedia Core Network Subsystem, or IMS (included in the PS domain). The EPC includes a mobile management entity (MME) and a home subscriber server (HSS). The MME in the EPC can interface with a mobile service switching center (MSC) or an MSC server. The MSC is part of a legacy core network supporting the CS domain.

A new core network, the fifth-generation core (5GC), is currently being defined, and is also part of an IP-CAN that supports IMS. The 5GC includes a unified data management (UDM), an access and mobility management function (AMF), and a user plane function (UPF), and other core network nodes. The AMF may interface with the MME via an optional N26 reference point. The UDM can be collocated with an HSS.

The IMS may include IMS nodes, for example a service centralization and continuity application server (SCC AS), which interfaces with an HSS/UDM. The IMS may further include IMS nodes known as an access transfer control function (ATCF), which is used for anchoring calls or sessions in the IMS, and an emergency access transfer function (EATF), which is used for anchoring emergency calls or emergency sessions in the IMS (for instance, the IMS of the Public Land Mobile Network (PLMN) where the UE currently resides, e.g. home PLMN (HPLMN) or visited/roamed-to PLMN (VPLMN)). A call or session is anchored at a network node if the network node stores information or context of the call or session. Effectively, any SIP request and response messages of the session are received at and forwarded or transmitted from the anchoring node (e.g. ATCF or SCC AS). Similarly, any packets containing media of the session are received at and forwarded or transmitted from a node anchoring media (e.g. ATGW).

A fifth generation mobile communications system (5GS) can include one or more types of access networks, including access networks that support: (1) a new radio (NR) access (which is a 5G access) that is connected to a 5G core network, and (2) an evolved universal terrestrial radio access (E-UTRA) that is connected to the 5GC. Communication protocols employed by the 5GS are governed by standards from the $3^{rd}$ Generation Partnership Project (3GPP). The 5GC is part of the 5GS.

A 5G access network includes a Next Generation Radio Access Network (NG-RAN) or a non-3GPP access network connected to the 5GC. An NG-RAN includes a radio access network that supports one or more of the following options with the common characteristic that the radio access network connects to a 5GC: (1) standalone New Radio, (2) New Radio is the anchor with E-UTRA extensions, or (3) standalone E-UTRA.

A non-3GPP access network refers to an access network that operates according to a protocol different from a protocol defined by the 3GPP. For example, a non-3GPP access network can include a wireless local area network (WLAN) that operates according to the IEEE 802.11 standards. As another example, a non-3GPP access network can include a 1X access network (e.g. a code division multiple access (CDMA) access network).

A 4G/LTE mobile communications system (referred to as an Evolved Packet System (EPS)) includes a 4G access network supporting E-UTRA that is connected to a 4G core network. A 4G core network is referred to as an EPC. EPC refers to a framework that supports converged voice, video and data in an EPS, such as a Long-Term Evolution (LTE) system. The 4G core network (EPC) includes a mobility management entity (MME), a packet data network gateway (PDN-GW), and other core network nodes. The AMF and MME are control nodes in the respective 5G and 4G mobile communications systems. The AMF and MME are responsible for UE paging, bearer activation and de-activation, and performance of other control functions. The UPF or PDN-GW is a point of exit or entry for data traffic of a UE. The EPC is part of the EPS.

Various other types of mobile communications systems exist, such as the General Packet Radio Service (GPRS) system and the Global System for Mobile (GSM) system. Access networks for such other types of mobile communication systems include, among others, a Universal Mobile Telecommunications Service (UMTS) Terrestrial Radio Access Network (UTRAN) (also known as 3G) and a GSM Enhanced Data Rates for GSM Evolution (EDGE) Radio Access Network (GERAN) (also known as 2G).

In the PS domain, the signaling for the PS domain that is used to set up a voice call or session (in this disclosure, the terms call and session are used interchangeably) or video call can be in accordance with the Session Initiation Protocol (SIP). When SIP is used to set up a voice or video call, a UE sends a SIP INVITE request message to the network (e.g., IMS).

Prior to sending a SIP INVITE request message, a UE must register with the IMS. A registration with the IMS involves the UE sending a SIP REGISTER request message to the network (e.g., IMS).

A UE registers with a core network using, e.g. a 5GC non-access stratum (NAS) registration procedure or an EPC NAS registration procedure. An NAS registration procedure is performed by the UE to gain access to a mobile communication system, such as the 5GS or EPS. A registration with an EPC/EPS or 5GC/5GS involves an initial registration or a periodic (or subsequent) registration. An initial registration with the EPC or EPS involves an attach procedure, which includes sending an ATTACH REQUEST message to the network (e.g., EPC). A periodic or subsequent registration with the EPC or EPS involves a tracking area update (TAU) procedure, which includes sending a TAU REQUEST message to the network (e.g., EPC). An initial registration or a periodic or subsequent registration with the 5GC or 5GS involves sending a REGISTRATION REQUEST message to the network (e.g., 5GC).

In various scenarios, a voice or video call that is initiated and set up in a PS domain may be handed over to a CS domain. For example, a Voice-over-LTE (VoLTE) connection may be initiated with IMS control. If the UE moves away from cells providing IMS voice support over PS, LTE coverage may be lost and the UE may be left with only 2G or 3G cells for connections. Similarly, for video, a Video-over-LTE connection may be initiated with IMS control. If the UE moves away from cells providing IMS video support over PS, LTE coverage may be lost and the UE may be left with only 2G or 3G cells for connections. In order to avoid dropping the ongoing call, a PS-to-CS domain switch of the call may be performed. That is, the IMS call may be handed over to 2G or 3G cells connected to CS domain nodes (e.g. MSC servers) handling and continuing to control the ongoing session or call.

SRVCC refers to a form of service continuity that enables a voice call from the VoIP or IMS packet domain (e.g. LTE) to transition to a legacy CS domain. The PS domain may utilize a UTRA connected to a GPRS core network, E-UTRA connected to an EPC, E-UTRA connected to a 5GC, or NR connected to a 5GC.

An IMS voice session that is initiated on NG-RAN connected to a 5GC can be transferred to E-UTRA connected to an EPC. The session may then be transferred from IMS on the E-UTRA directly to a CS domain. The system may, for example, determine that an E-UTRA cell is preferred (e.g. in signal strength, quality, or other preference) than the NG-RAN cell (e.g., when the UE moves from a 5G coverage area to a 4G coverage area). Subsequently, the system may determine that a cell offering CS services (by the CS domain) is more preferred than an E-UTRA cell connected to EPC (e.g., when the UE moves from a 4G coverage area to a 3G or 2G coverage area).

SRVCC can also include video SRVCC (vSRVCC) for video call continuity, reverse SRVCC (rSRVCC), or emergency SRVCC (eSRVCC).

For vSRVCC, an IMS video session that is initiated on NG-RAN connected to a 5GC can be transferred to E-UTRA connected to an EPC. The session may then be transferred from IMS on the E-UTRA directly to a CS domain. The system may, for example, determine that an E-UTRA cell is preferred (e.g. in signal strength, quality, or other preference) than the NG-RAN cell. Subsequently, the system may determine that a cell offering CS services (by the CS domain) is a preferred cell than an E-UTRA cell connected to EPC.

Reverse SRVCC refers to voice call continuity for a CS call from a UTRAN or GERAN communication system to an IMS over E-UTRAN or HSPA communication system for calls that are anchored in IMS. Reverse SRVCC may also refer to video call continuity for a CS call from a UTRAN communication system to an IMS over E-UTRAN or HSPA communication system for calls that are anchored in IMS. A UE may be handed over from a CS legacy network to an EPS via rSRVCC.

Emergency SRVCC is similar to SRVCC for non-emergency calls, with the exception that an Emergency Access Transfer Function (EATF), rather than an ATCF, is included in voice or video sessions for UEs that are subject to emergency SRVCC. The EATF provides IMS-based mechanisms for enabling service continuity of IMS emergency sessions. Specifically, the EATF is a function in the serving (or visited, if roaming) IMS network, providing the procedures for IMS emergency session anchoring and PS-to-CS access transfer (3GPP TS 23.237).

5G SRVCC is being defined in order to apply SRVCC directly to sessions initiated on NG-RAN. The session may be transferred from NG-RAN directly to a CS domain, for example, when the system determines that a cell offering CS services (by the CS domain) is a stronger, better or preferred cell than a cell used by the NG-RAN.

When a UE registers with the EPC and the EPC subsequently registers the UE with CS domain's core network, the UE can perform a CS fallback (CSFB). CS fallback allows a UE to obtain CS services, such as CS voice calls and CS video calls, via the CS domain while obtaining PS or data services via the EPC. This may be useful, for example, when the PS data services offered by EPC do not include (PS) voice calls, when the user's subscription does not permit access to the PS voice calls, when the UE does not support PS voice calls, or, if roaming, the user's home network does not support, permit, allow, etc. PS voice calls.

A UE that is registered with EPC and with CS domain's core network may be referred to as a UE that is combined registered, or combined attached, or having performed combined EPS mobility management procedures. A UE that is combined registered may send a NAS service request message in order to initiate CS fallback. Examples of a NAS service request message are an EXTENDED SERVICE REQUEST message or a SERVICE REQUEST message. Other NAS service request messages are possible.

When a UE registers with the 5GC, the UE may receive an indication from the network that some services (e.g. emergency services) need to be obtained after service fallback. For example, upon detecting a need for emergency services, the UE would send a NAS service request message in order to initiate service fallback. The network, upon receiving the request for service fallback, would determine whether the service is obtained from a different 5G access network (e.g. NR or E-UTRA) or from a different system (e.g. EPS). When the service is to be obtained from a different access, the service fallback may be referred to as an access fallback. When the service is to be obtained from a different system, the service fallback may be referred to as a system fallback.

Generally, two types of SRVCC are contemplated: (1) handover from NG-RAN to E-UTRAN (i.e. E-UTRA connected to an EPC) and SRVCC from E-UTRAN to a CS domain ("4G SRVCC"), and (2) from NG-RAN directly to CS domain ("5G SRVCC"). A UE or network may support only one, both, or neither of these two types.

A UE may be in single-registration mode or dual-registration mode when registered via NG-RAN with a 5G core network. The UE may perform inter-system change to EPC. Upon inter-system change, the UE may perform 4G registration procedures with the EPC, i.e. either an attach procedure or a TAU procedure.

At present, neither the UE nor the network can determine which type(s) of SRVCC is supported by a UE using NG-RAN or using E-UTRAN during initial NAS registration or during NAS registration following inter-system change. This can result in voice call sessions being dropped or disconnected after being transferred to a CS domain due to the voice media failing to transfer. The same can also occur for transference of other media types, such as video, as well as transference of media during different stages of the call session (e.g. alerting phase, mid-call, etc.).

To minimize the voice interruption delay during a call transition from PS to CS domains, ATCF and Access Transfer Gateway (ATGW) are deployed. More specifically, the ATCF and ATGW are involved in a voice or video call originated on NG-RAN or E-UTRAN, if the session can be subjected to: (1) 4G SRVCC, after it is transferred from NG-RAN to E-UTRAN, or (2) 5G SRVCC, after it is transferred from E-UTRAN to NG-RAN.

The SCC AS determines whether a UE and network support SRVCC, during SIP registration. The SCC AS informs the ATCF if the UE and network support SRVCC. The SCC AS configures the ATCF with a correlation MSISDN (Mobile Station International Subscriber Directory Number). The correlation MSISDN (also known as C-MSISDN or CMSISDN) may be associated with the UE.

A mobile-terminated (MT) SIP INVITE request message transmitted by the SCC AS establishes a SIP session. The MT SIP session needs to be anchored at the ATCF or ATGW. In order for the ATCF or ATGW to anchor the MT SIP session, the SCC AS determines whether the UE and network support SRVCC.

A mobile-originated (MO) SIP INVITE request message transmitted by the UE establishes a SIP session. The MO SIP session needs to be anchored at the ATCF or ATGW. In order for the ATCF or ATGW to anchor the MO SIP session, the SCC AS determines whether the UE and network support SRVCC.

At present, the ATCF cannot determine whether it should anchor media in the ATGW for an originating or terminating call depending on whether SRVCC is supported by any of the access of the serving PLMN(s). Further, the SCC AS cannot determine whether it has to provide (PS-to-CS) SRVCC related information to a related ATCF (including CMSISDN).

The present disclosure describes techniques for mitigating the risk of failed call continuity procedures for voice or video sessions that are initiated on NG-RAN or E-UTRAN. In an embodiment, a UE performs a NAS registration via a first access connected to a first core network. During the NAS registration, the UE indicates its support for a "fallback type" or "SRVCC type" that is applicable when using a second access connected to a second core network. For example, the "SRVCC type" indicates one or more of 4G SRVCC, 4G vSRVCC, 5G SRVCC, and 5G vSRVCC supported by the UE. The "fallback type" indicates one or more of CSFB, system fallback, and access fallback supported by the UE. In some cases, the "fallback type" can indicate the UE's support for combined registration with EPC.

If an "SRVCC type" was indicated during the NAS registration, the UE may perform, while connected with the NG-RAN or E-UTRAN connected to the first core network, a SIP session setup procedure for a session including media. The UE may receive, in response to the UE indicating its support for the "SRVCC type", from a second access network connected to a second core network during the session including media, a handover command, while the UE is using the second access network connected to the second core network. The handover command causes the media of the session to be handed over to a third access network connected to a third core network. The third core network and the third access network support accessing services of the CS domain.

In another embodiment, the UE may receive, while performing the SIP session setup procedure, an indication that a SIP network (e.g. IMS) supports SRVCC for the SIP session in response to the UE indicating its support for the "SRVCC type".

In another embodiment, an IMS network element performs a third-party SIP registration in response to receiving a SIP REGISTER request message from a UE. The IMS network element receives, from a data storage connected to a first core network, a first indication that the UE supports SRVCC, in response to the first core network having received from the UE an indication that the UE supports an "SRVCC type" when the UE is using a second core network.

The IMS network element provides a second indication to the UE in at least one of a SIP invitation for a first session or a SIP response to a second SIP invitation for a second session.

If a "fallback type" was indicated during the NAS registration, the UE may receive, during NAS registration, an indication that (emergency) service fallback is supported, due to the "fallback type" that was indicated. The UE may transmit a first NAS message via the first access network to the first core network (e.g., 5GC), e.g. when an emergency number is detected. Subsequently, the UE may receive an indication from the first access network, the indication related to the second core network (e.g., a target core network for fallback). The indication related to the second core network may understood to be an indication for the UE to perform registration procedures related to the second core network, e.g. 4G NAS registration procedures (in case the second access network (e.g. E-UTRA) is connected to EPC) or 5G NAS registration procedures (in case the second access network (e.g. E-UTRA) is connected to 5GC). The UE then performs combined registration procedures via the second access network connected to the second core network (e.g., EPC) due to the "fallback type" that was indicated. Subsequently, the UE may transmit a second NAS message via the second access network to the second core network, the second NAS message including at least one of a CSFB indication or an emergency CSFB indication. Subsequent to the sending of the second NAS message, the UE sets up a CS call or CS emergency call via a third access network connected to a third core network supporting the CS domain.

FIG. 1 is a block diagram of an example communication arrangement to allow a UE 102 to perform communications over various different types of mobile communication systems. In the example of FIG. 1, the UE 102 may be able to communicate with any one or more of a 5GS 104, an EPS 106, a 3G system (3GS) 108, and a non-3GPP system 110.

The 5GS 104 includes an NR access network and/or an E-UTRA 112, which is connected to an AMF 114. Other core network nodes of the 5GS 104 are not depicted for better clarity.

The EPS 106 includes an E-UTRA 116 that is connected to an MME 118. Other core network nodes of the EPS 106 are not depicted for better clarity.

The 3GS 108 includes a UTRAN and/or GERAN 120 that is connected to a Serving GPRS Support Node (SGSN) and an MSC 122. The 3GS can also be referred to as GPRS or GSM, for simplicity.

The non-3GPP system 110 includes a non-3GPP access network 124 (e.g., a WLAN or a 1X access network), and a non-3GPP core network node 126. The non-3GPP core network node, shown separately for simplicity, may be part of another system, e.g. EPS (where the node is named ePDG) or 5GS.

As further shown in FIG. 1, a Public Safety Answering Point (PSAP) 128 represents an entity that is to answer an emergency call. For example, the PSAP can be part of or be able to connect to a police department, a fire department, a 911 call center, or any other entity to handle calls for emergency service(s).

The 5GS 104, the EPS 106, the 3GS 108 (more specifically, the SGSN 121) may be able to support PS domain emergency services with the PSAP 128. The 3GS 108 (more specifically, the MSC 122) is also able to support CS domain emergency services with the PSAP 128.

The AMF 114, the MME 118, and the SGSN 121 enable access to the PS domain. While the SGSN allows core network access to the PS domain, in practice no PS voice or PS emergency services are supported via the SGSN 121, UTRAN 120, or GERAN 120.

The MSC 122 enables access to the CS domain.

As shown in FIG. 1, the UE 102 is connected to the access network 112 of the 5GS 104 supported by an N1 interface, and is connected to the access network 116 of the EPS 106 supported by an S1 interface.

Not shown in FIG. 1, between the MME and AMF, there can be the N26 interface. Between the MME and MSC there can be the SGs interface.

FIG. 1 shows example layers in the UE 102, including a channel layer 130 to communicate over a wireless medium, an access stratum (AS) layer 132, an NAS layer 134, and one or more higher layers 136. The one or more higher layers 136 can include a handover request handling module 138 for handling requests to handover calls at the UE 102. The one or more higher layers 138 can include an application layer or any other type of layer.

Figure 2:
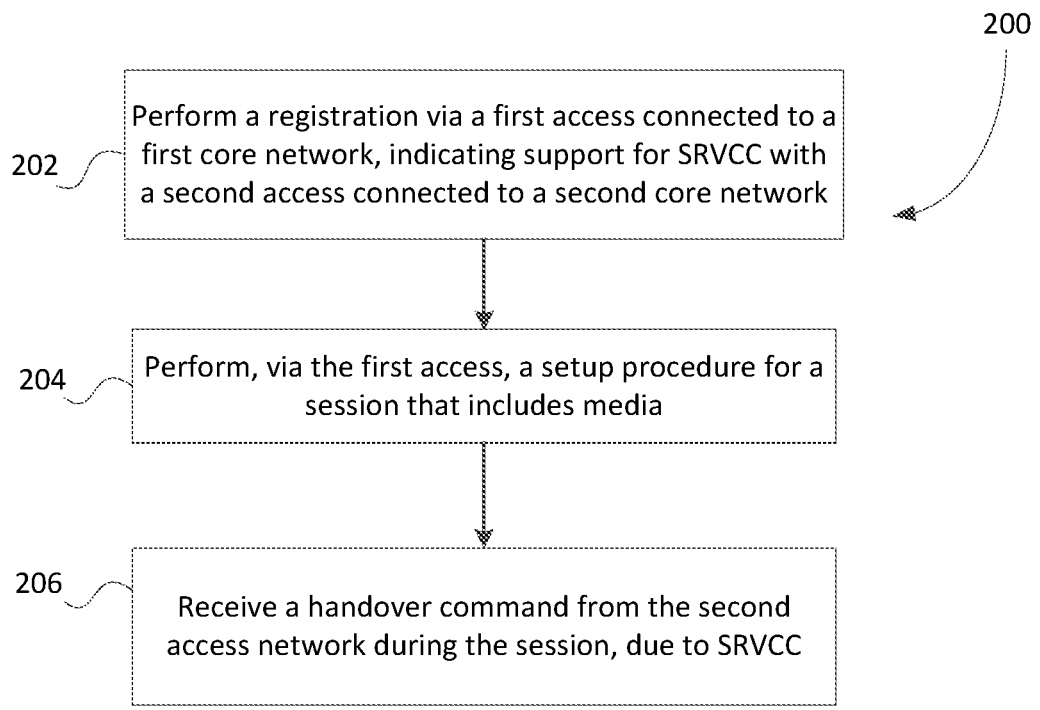
FIG. 2 shows, in flowchart form, an example method for originating a PS call or session when connected to a first core network, and performing, when connected to a second core network, a handover of the call or session to a third core network offering CS services.

Reference is made to FIG. 2 which shows, in flowchart form, an example method 200 for performing a session handover. The operations of method 200 may be performed by one or more processors of a UE. In particular, the operations may be performed upon execution of processor-readable instructions that are stored in a storage medium of a UE. The UE may, in at least some embodiments, be dual registration capable. That is, the UE may be capable of performing dual registration with two different types of mobile communication systems, such as with a 5GS and an EPS. The dual registration can be a concurrent dual registration, for example, in which the UE is registered with two mobile communication systems at the same time.

In operation 202, the UE performs registration via a first access connected to a first core network. The first core network may, for example, be the 5GC. In particular, the UE may perform a NAS registration via an NG-RAN that is connected to a 5GC. To register, the UE may send a NAS REGISTRATION REQUEST message to the 5G core network. The NAS registration includes an indication that the UE supports 4G SRVCC. In some embodiments, the indication of support for 4G SRVCC may comprise an indication of support for PS-to-CS SRVCC or SRVCC from E-UTRAN to UTRAN or GERAN. The UE may perform a SIP registration in IMS via the NG-RAN connected to the 5GC.

In operation 204, the UE performs a setup procedure for a session that includes media. The setup procedure may, for example, be a SIP session set up procedure. The UE receives, via the NG-RAN, at least one of a SIP INVITE request (e.g., in a mobile-terminating SIP session setup procedure discussed below) or a SIP response to a SIP INVITE request (e.g., in a mobile-originating SIP session setup procedure discussed below) for the session. In at least some embodiments, the SIP INVITE request or the SIP response to a SIP INVITE request may contain an indicator for SRVCC. This indicator for SRVCC in the SIP response or SIP INVITE indicates to the UE that a session is or will be anchored in the SCC AS. In some embodiments, as discussed below, this indicator is implemented by including the "g.3gpp.srvcc" feature capability indicator in the Feature-Caps header field of a SIP request or a SIP response to a SIP request. In some embodiments, the indicator may comprise an indication of support for 4G SRVCC, or "PS-to-CS SRVCC". In particular, the indicator for SRVCC may indicate support for 4G SRVCC if support for "PS-to-CS SRVCC" or 4G SRVCC or SRVCC from E-UTRAN to UTRAN or GERAN was indicated during NAS registration.

In some embodiments, the UE may, in addition to indicating that the UE supports 4G SRVCC, indicate support for "5G PS-to-CS SRVCC" or (5G) SRVCC from NG-RAN to UTRAN during NAS registration. The indicator for SRVCC may indicate support for 5G SRVCC if support for "5G PS-to-CS SRVCC" or "SRVCC from NG-RAN to UTRAN" was indicated during NAS registration.

In operation 206, the UE receives a handover command from an access network connected to a second core network during the session. The second core network may, for example, be an EPC. That is, the UE may receive a handover command via an E-UTRAN (i.e. E-UTRA connected to the EPC). The handover command causes the media (e.g. audio, video, etc.) of the session to be handed over to an access network associated with a third core network. The handover command may, for example, be a command for SRVCC. In particular, the third core network may support accessing services of the CS domain and the handover command may comprise a request for handing over (media of) the session to CS. In some embodiments, the session may be transferred from the NG-RAN (e.g. E-UTRA connected to the 5GC) to the E-UTRAN (i.e. E-UTRA connected to the EPC) prior to receiving the handover command (e.g., when the UE moves from a 5G coverage area to a 4G coverage area).

A UE in accordance with another example embodiment will now be described. The UE is both 4G- and 5G-capable.

The UE performs a NAS registration (e.g. EPC attach procedure) via an E-UTRA connected to an EPC (i.e., E-UTRAN). The NAS registration includes, at least, an indication of UE's support for 5G SRVCC or (5G) SRVCC from NG-RAN to UTRAN.

The UE performs a SIP registration in IMS via the E-UTRAN. Subsequently, the UE performs a setup procedure for a session, for example, a SIP session set up procedure. The UE receives, via the E-UTRAN, at least one of a SIP INVITE request (e.g., in a mobile-terminating SIP session setup procedure discussed below) or a SIP response to a SIP INVITE request (e.g., in a mobile-originating SIP session setup procedure discussed below) for the session. The SIP INVITE request or the SIP response to a SIP INVITE request may contain an indicator for SRVCC in response to the indication of UE's support for 5G SRVCC or (5G) SRVCC from NG-RAN to UTRAN transmitted during NAS registration. If support for "5G PS-to-CS SRVCC" was indicated during NAS registration, the indicator may comprise an indication that the session is or will be anchored in the SCC AS.

If support for "PS-to-CS SRVCC" or 4G SRVCC was indicated during the NAS registration, the indicator may comprise an indication that the session is or will be anchored in the SCC AS.

The UE subsequently receives a handover command via an NG-RAN connected to a 5GC. The UE may receive the handover command while using the NG-RAN. The handover command causes the media (e.g. audio, video, etc.) of the session to be handed over to an access network associated with a third core network. The handover command may, for example, be a command for SRVCC. In particular, the third core network may support accessing services of the CS domain and the handover command may comprise a request for handing over the session to CS. In some embodiments, the session may be transferred from the E-UTRAN to the NG-RAN prior to receiving the handover command (e.g., when the UE moves from a 4G coverage area to a 5G coverage area).

Figure 3:
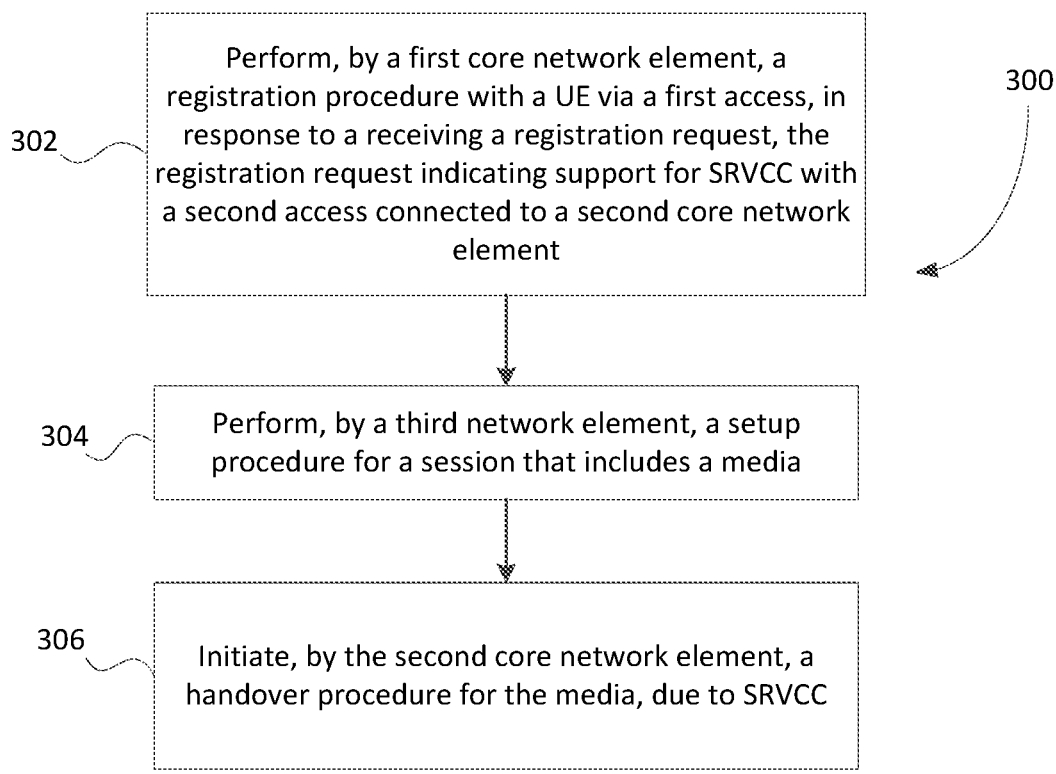
FIG. 3 shows, in flow chart form, another example method for performing a session handover.

Reference is made to FIG. 3 which shows, in flowchart form, an example method 300 for enabling a session handover. The operations of method 300 may be performed by one or more processors of network elements in a network system. In particular, the operations may be implemented, at least in part, by a mobile management entity (MME) in a mobile communication system if a NAS registering is performed via a 4G RAN connected to EPC including the MME, or by an access and mobility management function (AMF) in a mobile communication system if a NAS registering is performed via a 5G RAN connected to 5GC including the AMF.

In operation 302, a first network element performs the NAS registration in response to receiving a registration request from the UE. During the NAS registration, the first network element receives from the UE indication of UE's support for 4G SRVCC (if the first network element is an AMF) or 5G SRVCC (if the first network element is an MME).

In operation 304, a third network element performs a setup procedure for a session that includes media. Note that prior to the setup procedure for the session, the third network element may perform a SIP registration via the 4G RAN (if the first network element is an MME) or 5G RAN (if the first network element is an AMF) with the UE. The third network element may be an SCC AS. During the setup procedure for the session, the third network element sends at least one of a first session initiation invite for a first session or a response to a second session initiation invite for a second session to the UE. For example, the third network element may send, to the UE, a SIP INVITE request for a mobile-terminating session or a SIP response to a SIP INVITE request for a mobile-originating session. The SIP response or the SIP INVITE sent to the UE comprises an indication of SRVCC.

In operation 306, the second network element initiates a handover procedure for (the media of) the session, due to SRVCC. The second network element can be an MME (if the first network element is an AMF) or an AMF (if the first network element is an MME).

If the indicator for SRVCC is sent to the UE in 4G, after transfer of the session to NG-RAN connected to 5GC, the second network element (e.g., AMF) considers to apply PS-to-CS SRVCC session continuity procedures, if the speech media is carried by a Protocol Data Unit (PDU) session, i.e. the PDU session is associated with a 5G QoS Identifier (5QI) set to "1". When the PDU session is associated with a 5QI set to "1", the PDU session supports QoS needed for voice media.

If the indicator for SRVCC is sent to the UE in 5G, after transfer of the session to E-UTRA connected to EPC, the second network element (e.g., MME) considers to apply PS-to-CS SRVCC session continuity procedures, if the speech media is associated with a bearer with QoS Class Identifier (QCI) of 1.

SRVCC of calls that are not considered active, e.g. calls that have not yet been answered by the called party (also known as "pre-alerting phase", "pre-alerting state", "early dialog phase, "early dialog state") and SRVCC of calls that are on hold (referred to as "mid-call") require additional negotiation of support by the UE and network entities using indicators that are specific to these types of calls. If the UE supports pre-alerting or mid-call, then the UE may indicate support for these capabilities in the SIP REGISTER sent over NG-RAN, e.g. using a feature tag in the SIP REGISTER request message.

Single radio video call continuity (vSRVCC) may be implemented in a similar manner as single radio voice call continuity. For example, in vSRVCC an indicator may be included when the UE registers with 5GC via NG-RAN, where the indicator is for indicating that the UE supports 4G vSRVCC for sessions including video. The indicator is carried over E-UTRA connected to EPC and the session was originated over NG-RAN connected to 5GC.

Emergency Service Fallback

An emergency service fallback may be needed when a UE requires emergency services after registering with the 5GC. The core network (e.g., 5GC) may indicate that emergency service fallback is supported, but the PLMN may be configured to support calls for emergency services via a CS domain.

Emergency service fallback may involve a system fallback, where the UE subsequently registers with the EPC by means of an attach procedure or the tracking area update procedure, subsequent to detecting an emergency number. The emergency number may, for example, be dialed or selected by a user of the UE. The UE is to perform combined registration procedures with the EPC in order to perform a fallback to the CS domain, i.e. CS fallback or CSFB.

At present, the core network (e.g., 5GC) cannot determine whether the UE supports CSFB or combined registration procedures with the EPC, and thus cannot advise whether the UE should perform emergency service fallback to obtain the emergency services via a call (i.e. by means of sending a setup message, e.g. an EMERGENCY SETUP message or a SETUP message) via the CS domain. The call, in response to detecting the emergency number, via the CS domain may be an emergency call, that involves sending an EMERGENCY SETUP message. Alternatively, the call, in response to detecting the emergency number, via the CS domain may be a non-emergency (normal) call that involves sending a SETUP message.

CSFB is supported by the EPS, if the UE and network successfully perform combined registration with the EPC network, i.e. combined attach procedure or combined tracking area update procedure.

When the UE registers with the 5G core network, the network cannot determine if the UE is capable of performing combined registration with the EPC network. In this scenario, an indication that the UE is capable of performing a combined registration with the EPC network may be useful. Performing combined registration procedures with EPC is known as performing combined registration procedures in S1 mode. Performing registration procedures with 5G core network is known as performing registration procedures in N1 mode.

In the absence of an indication that the UE is capable of performing a combined registration with the EPC network, the network should not indicate support for system fallback for emergency services or access fallback for emergency services even if the network supports the emergency service via the CS domain, as this will delay the emergency call setup while there may be a life and death situation.

The 5G core network can instruct the UE to perform system fallback or access fallback, e.g. for emergency services. The 5G core network determines whether to instruct the UE to perform system fallback or access fallback based on the indication provided by the UE, the indication that the UE is capable of performing the combined registration with an EPC network.

A UE in accordance with another example embodiment will now be described. The example UE is both 4G- and 5G-capable. The example UE may support CSFB and emergency service fallback (e.g. system fallback or access fallback for emergency services).

The UE performs a NAS registration via a NG-RAN (5G RAN and NG-RAN are used interchangeably throughout) with a 5G core network. The UE indicates, using a first indication, support for performing combined registration procedures with an EPC network during the NAS registration. The AMF, which is part of the 5G core network, indicates, using a second indication and during the NAS registration, support for emergency service fallback based on the first indication that the UE supports performing combined registration procedures with the EPC network. Subsequently, based on the second indication of support for emergency service fallback, the AMF receives a NAS request message (e.g. a NAS request message indicating a request for service fallback. An example of the NAS request message is a service request message such as a SERVICE REQUEST message) from the UE. In response to the NAS request message from the UE, the AMF indicates a target core network for emergency service fallback to the NG-RAN. An indication of target core network is also conveyed to the UE. Based on this indication, the UE may perform a suitable NAS registration procedure (in either S1 or N1 mode).

In some embodiments, the indication of support for combined registration may comprise an indication that the UE supports the CS domain, CS protocols, or one or more CS access networks. Example CS networks include 1X, GERAN, and UTRAN.

In some embodiments, the indication of support for combined registration may comprise an indication that the UE supports evolved mobility management (EMM) combined procedures. If the UE indicates support for EMM combined procedures, the UE may receive an indication that emergency service fallback is supported. On the other hand, if the indication of support for combined registration comprises an indication that the UE does not support EMM combined procedures, then the UE may not receive an indication that emergency service fallback is supported.

In some implementations, the UE sends, via the 5G RAN, the NAS request message (e.g. the service request message described above), subsequent to NAS registration with 5GC. The UE subsequently receives a second indication (e.g. an indication of support for emergency service fallback) based on the first indication. Upon detecting a request for service (e.g. emergency service), the UE performs, based on detecting the request and the second indication, the combined registration procedures. For example, the UE may perform the combined registration procedures via an E-UTRA connected to the EPC network.

Figure 4:
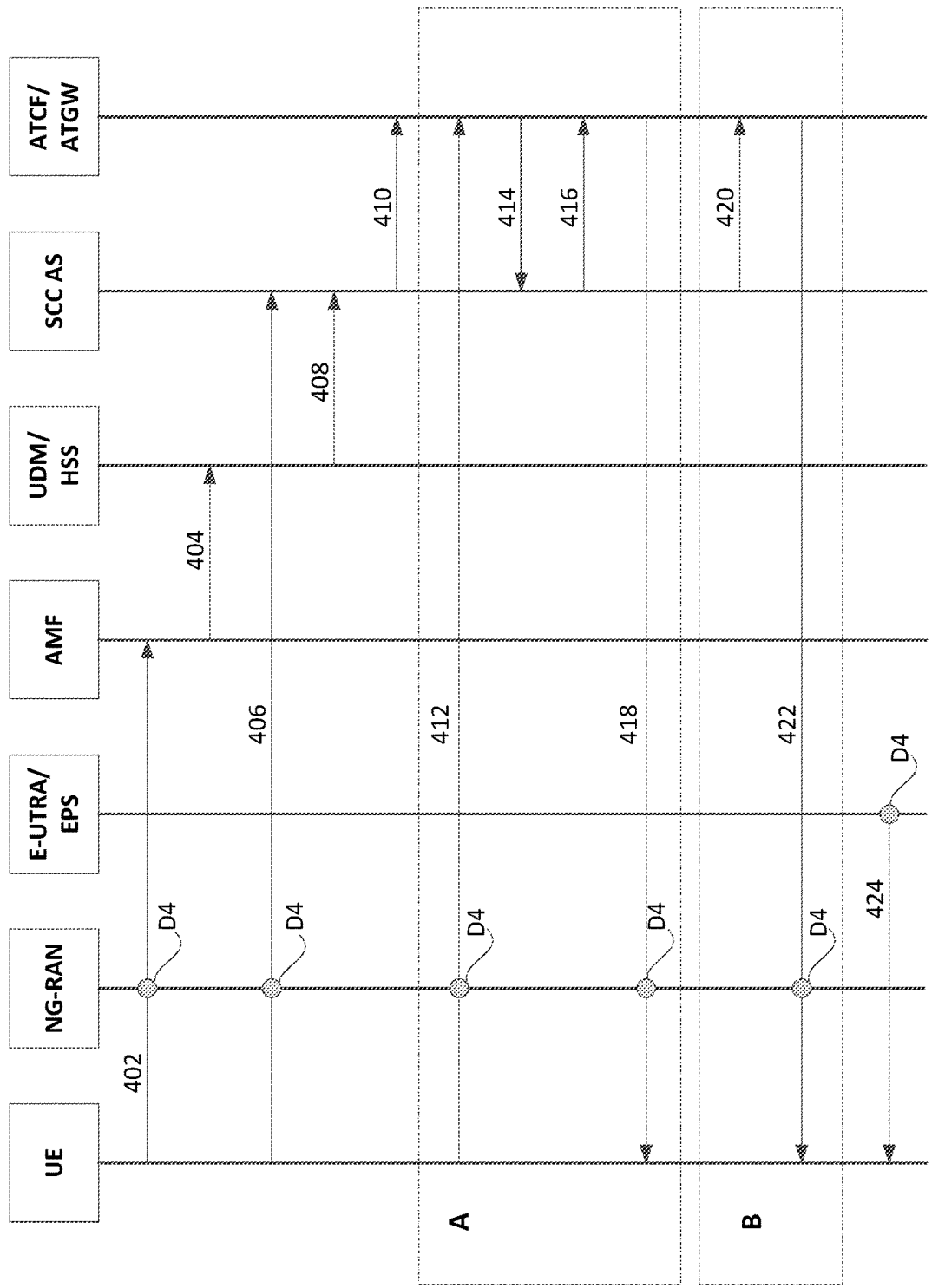
FIG. 4 is a first example sequence diagram illustrating message flow in an SRVCC procedure.

Reference is made to FIG. 4 which is an example flow diagram illustrating message flow of a (4G) SRVCC process when registering and initiating a (non-emergency) session via 5GS. The messages are transmitted via NG-RAN connected to 5GC. For clarity, the dots D4 at the intersections of message flow lines and the entity lines indicate that the corresponding message traverses the particular entity (node); in the absence of a dot D4, the entity is not involved with the message flow.

At 402, a UE using NG-RAN sends a REGISTRATION message to the AMF. The message indicates that the UE supports one or both of 4G SRVCC and 4G vSRVCC. The message may also indicate that the UE supports one or both of 5G SRVCC and 5G vSRVCC.

In an embodiment, the AMF determines whether SRVCC is supported by the UE or whether vSRVCC is supported by the UE. The UE supports SRVCC if it indicates that (4G) SRVCC or 5G SRVCC is supported, or the UE supports vSRVCC if it indicates that (4G) vSRVCC or 5G vSRVCC is supported.

If (4G) SRVCC is indicated as supported by the UE and the AMF knows that EPC network does not support (4G) SRVCC, then the AMF determines (4G) SRVCC is not supported. If the AMF does not know whether EPC network supports (4G) SRVCC, the AMF determines (4G) SRVCC is supported. If the AMF does not know if the EPC supports (4G) SRVCC, the AMF assumes that the EPC does support (4G) SRVCC. This ensures that if (4G) SRVCC is applied to a session when the UE is using the EPC, the session is successfully handed over to the CS domain.

If (4G) vSRVCC is indicated as supported by the UE and the AMF knows that EPC network does not support (4G) vSRVCC, then the AMF determines (4G) vSRVCC is not supported. If the AMF does not know whether EPC network supports (4G) vSRVCC, the AMF determines (4G) vSRVCC is supported.

If 5G SRVCC is indicated as supported by the UE, and the 5GC network of the AMF also supports 5G SRVCC, the AMF determines 5G SRVCC is supported. Otherwise, the AMF determines 5G SRVCC is not supported. If 5G vSRVCC is indicated as supported by the UE, and the 5GC network of the AMF also supports 5G vSRVCC, the AMF determines 5G vSRVCC is supported. Otherwise, the AMF determines 5G vSRVCC is not supported.

At 404, the AMF stores in the UDM/HSS an indication that SRVCC is supported if the AMF determined 5G SRVCC is supported or the AMF determined (4G) SRVCC is supported. The AMF stores in the UDM/HSS an indication that vSRVCC is supported if the AMF determined 5G vSRVCC is supported or the AMF determined (4G) vSRVCC is supported. The HSS/UDM stores the indication that SRVCC is supported as the "UE PS to CS SRVCC capability". The HSS/UDM stores the indication that vSRVCC is supported as the "UE PS to CS vSRVCC capability".

In other embodiments the UDM/HSS stores different instances of the indication that SRVCC is supported or vSRVCC is supported, if the indication(s) for the UE is(are) provided by both the MME and AMF.

At 406, the UE using NG-RAN sends a SIP REGISTER request message to the network. The SCC AS receives the SIP REGISTER request message.

At 408, the SCC AS obtains registration state information from HSS/UDM using Sh interface, including one or both of the UE PS to CS SRVCC capability or the UE PS to CS vSRVCC capability. The AMF stores in the UDM/HSS whether SRVCC is supported or whether vSRVCC is supported.

In an embodiment, the SCC AS determines that PS to CS SRVCC is usable for the UE if the UE PS to CS SRVCC Capability of the UE has value UE-SRVCC-CAPABILITY-SUPPORTED. In another embodiment, the SCC AS determines that PS to CS vSRVCC is usable for the UE if the UE PS to CS vSRVCC Capability of the UE has value UE-VSRVCC-CAPABILITY-SUPPORTED.

If the SCC AS has determined that one or both of PS to CS SRVCC or PS to CS vSRVCC is usable for the UE, the SCC AS sends a SIP MESSAGE request with SRVCC related information towards the ATCF serving the (SIP registered) UE, at 410. The SRVCC related information includes a C-MSISDN. The SCC AS retrieves the C-MSISDN from the UDM/HSS.

Blocks A and B of FIG. 4 represent alternative message flows. Block A represents part of an MO (mobile originating) SIP session setup procedure. Block B represents part of an MT (mobile terminating) SIP session setup procedure.

At 412, the UE using NG-RAN sends a SIP INVITE request message to the network. The ATCF receives the SIP INVITE request message.

At 414, the ATCF sends or forwards the SIP INVITE request message towards the UE. The SCC AS receives the SIP INVITE request message.

The SCC AS includes one or more indicators in a SIP response to SIP INVITE if the SCC AS has determined that one or both of PS to CS SRVCC and PS to CS vSRVCC is usable for the UE. The SCC AS indicates to the UE that a session is anchored in the SCC AS. At 416, the ATCF receives the response to the SIP INVITE request message.

The ATCF may instruct the ATGW to anchor the media, if the response includes one or more indicators that the SCC AS has determined that one or both of PS to CS SRVCC or PS to CS vSRVCC is usable for the UE. At 418, the ATCF sends the SIP response to the UE. The UE receives the SIP response with the one or more indicators that the SCC AS has determined that one or both of PS to CS SRVCC or PS to CS vSRVCC is usable for the UE, via NG-RAN.

The SCC AS includes one or more indicators in a SIP INVITE if the SCC AS has determined that one or both of PS to CS SRVCC or PS to CS vSRVCC is usable for the UE. The SCC AS indicates to the UE that the resulting SIP session will be anchored in the SCC AS. At 420, the ATCF receives the SIP INVITE request message.

The ATCF may instruct the ATGW to anchor the media, if the request includes one or more indicators that the SCC AS has determined that one or both of PS to CS SRVCC or PS to CS vSRVCC is usable for the UE. At 422, the ATCF sends the SIP request to the UE. The UE receives the SIP request with the indicator that the SCC AS has determined that one or both of PS to CS SRVCC or PS to CS vSRVCC is usable for the UE, via NG-RAN.

A precondition is that the UE transfers the session resulting from the SIP INVITE from NG-RAN to an E-UTRA connected to EPC (e.g., the UE moves from a 5G coverage area to a 4G coverage area, or the operator directs the UE to move from 5G to 4G due to loading issues).

The UE sends the measurement reports to the E-UTRA, and the E-UTRA decides to trigger an PS to CS SRVCC handover to CS access. At 424, E-UTRA connected to EPC sends a Handover from E-UTRAN Command message to the UE. The UE receives the Handover from E-UTRAN Command message.

Figure 5:
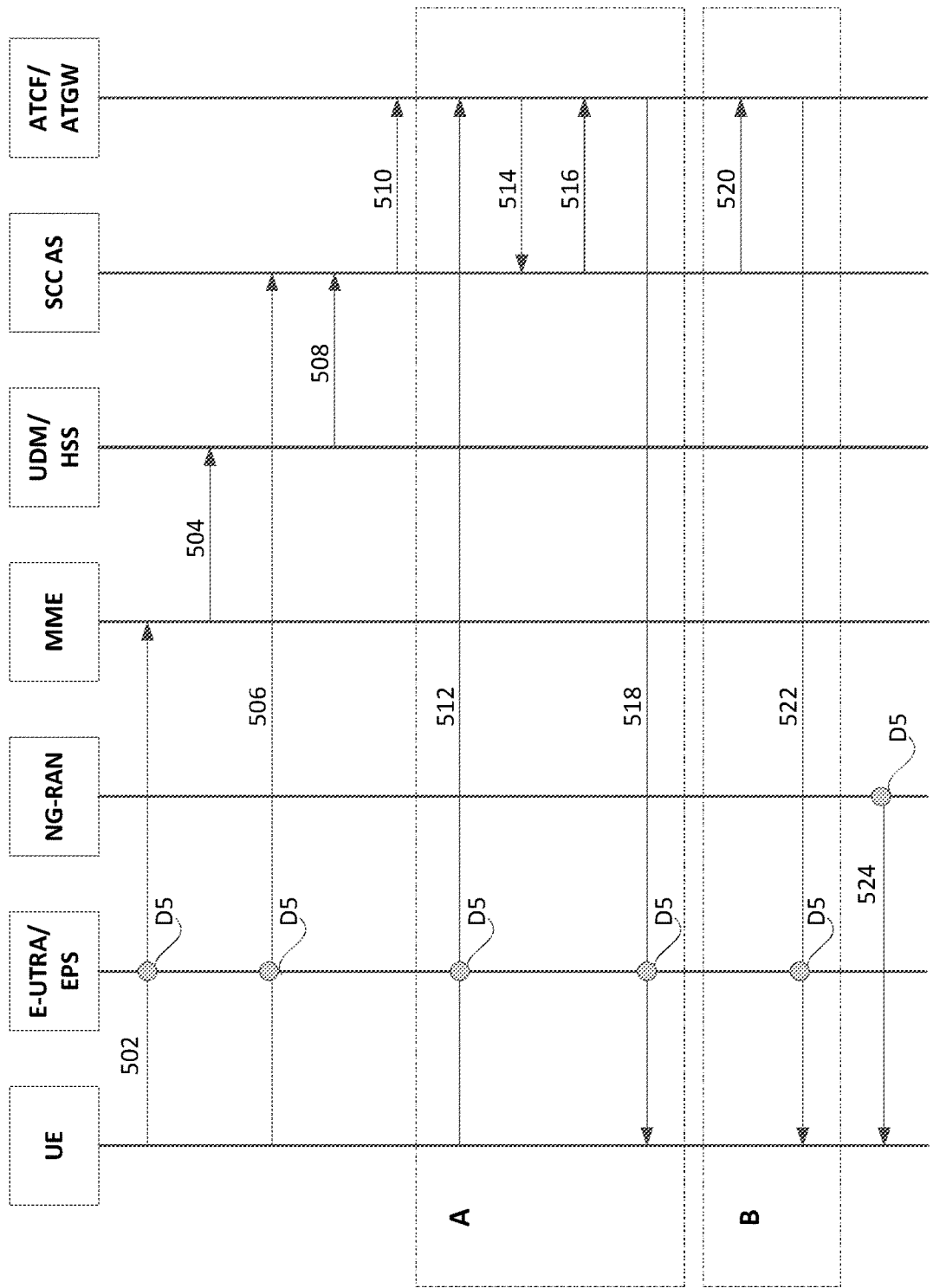
FIG. 5 is a second example sequence diagram illustrating message flow in an SRVCC procedure.

Reference is made to FIG. 5 which is an example flow diagram illustrating message flow of a 5G SRVCC process when registering and initiating a (non-emergency) session via 4G (or E-UTRA/EPS). The messages are transmitted via E-UTRA connected to EPC (i.e. EPS). For clarity, the dots D5 at the intersections of message flow lines and the entity lines indicate that the corresponding message traverses the particular entity (node); in the absence of a dot D5, the entity is not involved with the message flow.

At 502, a UE using E-UTRA connected to EPC sends a ATTACH message to the MME. The message indicates the UE supports one or both of 5G SRVCC or 5G vSRVCC. The message may also indicate that the UE supports one or both of 4G SRVCC or 4G vSRVCC.

In an embodiment, the MME determines whether SRVCC is supported by the UE or whether vSRVCC is supported by the UE. The UE supports SRVCC if it indicates that (4G) SRVCC or 5G SRVCC is supported, or the UE supports vSRVCC if it indicates that (4G) vSRVCC or 5G vSRVCC is supported.

If 5G SRVCC is indicated as supported by the UE and the MME knows that 5GC network does not support 5G SRVCC, then the MME determines 5G SRVCC is not supported. If the MME does not know whether 5GC network supports 5G SRVCC the MME determines 5G SRVCC is supported. If the MME does not know if the 5GC supports 5G SRVCC, the MME assumes the 5GC does support 5G SRVCC. This ensures that if 5G SRVCC is applied to a session when the UE is using the 5GC, then the session is successfully handed over to the CS domain.

If 5G vSRVCC is indicated as supported by the UE and the MME knows that 5GC network does not support 5G vSRVCC, then the MME determines 5G vSRVCC is not supported. If the MME does not know whether 5GC network supports 5G vSRVCC, the MME determines 5G vSRVCC is supported.

If (4G) SRVCC is indicated as supported by the UE, and the EPC network of the MME also supports (4G) SRVCC, the MME determines (4G) SRVCC is supported. Otherwise, the AMF determines (4G) SRVCC is not supported. If (4G) vSRVCC is indicated as supported by the UE, and the EPC network of the MME also supports (4G) vSRVCC, the MME determines (4G) vSRVCC is supported. Otherwise, the MME determines (4G) vSRVCC is not supported.

At 504, the MME stores in the UDM/HSS an indication that SRVCC is supported if the MME determined (4G) SRVCC is supported or the MME determined 5G SRVCC is supported. The MME stores in the UDM/HSS an indication that vSRVCC is supported if the MME determined 5G vSRVCC is supported or the MME determined (4G) vSRVCC is supported.

The HSS/UDM stores the indication that SRVCC is supported as the "UE PS to CS SRVCC capability". The HSS/UDM stores the indication that vSRVCC is supported as the "UE PS to CS vSRVCC capability".

In other embodiments the UDM/HSS stores different instances of the indication that SRVCC is supported or vSRVCC is supported, if the indication(s) for the UE is(are) provided by both the AMF and MME.

At 506, the UE using E-UTRA connected to EPC sends a SIP REGISTER request message to the network. The SCC AS receives the SIP REGISTER request message.

At 508, the SCC AS obtains registration state information from HSS/UDM using Sh interface, including one or both of the UE PS to CS SRVCC capability or the UE PS to CS vSRVCC capability. The MME stores in the UDM/HSS whether SRVCC is supported or whether vSRVCC is supported.

In an embodiment, the SCC AS determines that PS to CS SRVCC is usable for the UE if the UE PS to CS SRVCC Capability of the UE has value UE-SRVCC-CAPABILITY-SUPPORTED. In another embodiment, the SCC AS determines that PS to CS vSRVCC is usable for the UE if the UE PS to CS vSRVCC Capability of the UE has value UE-VSRVCC-CAPABILITY-SUPPORTED.

If the SCC AS has determined that one or both of PS to CS SRVCC or PS to CS vSRVCC is usable for the UE, the SCC AS sends a SIP MESSAGE request with SRVCC related information towards the ATCF serving the (SIP registered) UE, at 510. The SRVCC related information includes a CMSISDN. The SCC AS retrieves the CMSISDN from the UDM/HSS.

Blocks A and B of FIG. 5 represent alternative message flows. Block A represents part of an MO (mobile originating) SIP session setup procedure. Block B represents part of an MT (mobile terminating) SIP session setup procedure.

At 512, the UE using E-UTRA connected to EPC sends a SIP INVITE request message to the network. The ATCF receives the SIP INVITE request message.

At 514, ATCF sends the SIP INVITE request message. The SCC AS receives the SIP INVITE request message.

The SCC AS includes one or more indicators in a SIP response to SIP INVITE if the SCC AS has determined that one or both of PS to CS SRVCC or PS to CS vSRVCC is usable for the UE. The SCC AS indicates to the UE that a session is anchored in the SCC AS. The ATCF receives the response to the SIP INVITE request message, at 516.

The ATCF may instruct the ATGW to anchor the media, if the response includes one or more indicators that the SCC AS has determined that one or both of PS to CS SRVCC or PS to CS vSRVCC is usable for the UE. At 518, the ATCF sends the SIP response to the UE. The UE receives the SIP response with the one or more indicators that the SCC AS has determined that one or both of PS to CS SRVCC or PS to CS vSRVCC is usable for the UE, via E-UTRA connected to EPC.

The SCC AS includes one or more indicators in a SIP INVITE if the SCC AS has determined that one or both of PS to CS SRVCC or PS to CS vSRVCC is usable for the UE. The SCC AS indicates to the UE that the resulting SIP session will be anchored in the SCC AS. The ATCF receives the SIP INVITE request message, at 520.

The ATCF may instruct the ATGW to anchor the media, if the request includes one or more indicators that the SCC AS has determined that one or both of PS to CS SRVCC or PS to CS vSRVCC is usable for the UE. At 522, the ATCF sends the SIP request to the UE. The UE receives the SIP request with the one or more indicators that the SCC AS has determined that one or both of PS to CS SRVCC or PS to CS vSRVCC is usable for the UE, via E-UTRA connected to EPC.

A precondition is that the UE transfers the session resulting from the SIP INVITE from an E-UTRA connected to EPC to NG-RAN (e.g., the UE moves from a 4G coverage area to a 5G coverage area, or the operator directs the UE to move from 4G to 5G due to loading issues). The UE sends the measurement reports to the NG-RAN, and the NG-RAN decides to trigger an PS to CS SRVCC handover to CS access. NG-RAN sends a hand-over (HO) command to the UE, at 524. The UE detects the 5G-SRVCC HO.

Figure 6:
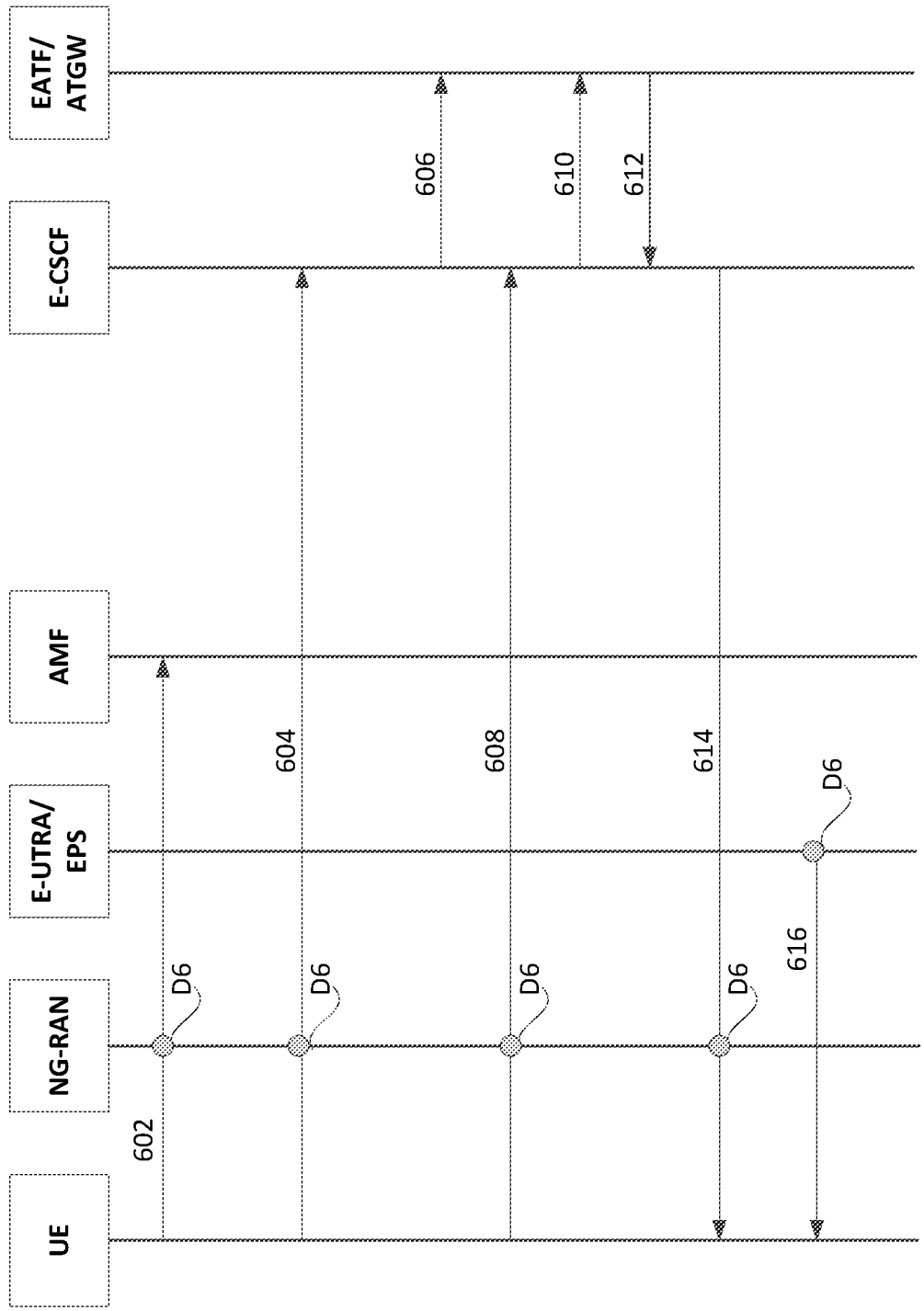
FIG. 6 is a third example sequence diagram illustrating message flow in an SRVCC procedure.

Reference is made to FIG. 6 which is an example flow diagram illustrating message flow of a (4G) SRVCC process when registering and initiating an emergency session via 5GS. The messages are transmitted via NG-RAN connected to 5GC (i.e. 5GS). For clarity, the dots D6 at the intersections of message flow lines and the entity lines indicate that the corresponding message traverses the particular entity (node); in the absence of a dot D6, the entity is not involved with the message flow.

At 602, a UE using NG-RAN sends a PDU Session Establishment Request message for emergency services to the AMF. The PDU Session Establishment Request message follows a REGISTRATION message, also sent to the AMF. The message indicates the UE supports one or both of 4G SRVCC and 4G vSRVCC. The message may also indicate that the UE supports one or both of 5G SRVCC and 5G vSRVCC.

When the AMF receives the PDU Session Establishment Request message for emergency services, the AMF disables 5G SRVCC at the NG-RAN (if 5G SRVCC for emergency services is not supported by the AMF).

When the AMF receives the PDU Session Establishment Request message for emergency services and it indicates the UE supports one or both of 5G SRVCC, the AMF enables 5G SRVCC at the NG-RAN (even if the subscription for the UE indicates 5G SRVCC is not supported).

At 604, the UE using NG-RAN sends a SIP REGISTER request message to the network for IMS emergency registration. The E-CSCF receives the SIP REGISTER request message. In an embodiment, the SIP REGISTER request message indicates the UE supports SRVCC.

In an embodiment, the E-CSCF determines whether SRVCC is supported by the UE. For example, the UE supports SRVCC if it indicates that (4G) SRVCC or 5G SRVCC is supported.

If (4G) SRVCC is indicated as supported by the UE and the E-CSCF knows that EPC network does not support (4G) SRVCC, then the E-CSCF determines (4G) SRVCC is not supported. If the E-CSCF does not know whether EPC network supports (4G) SRVCC, the E-CSCF determines (4G) SRVCC is supported.

If 5G SRVCC is indicated as supported by the UE, and the 5GC network of the E-CSCF also supports 5G SRVCC, the E-CSCF determines 5G SRVCC is supported. Otherwise, the E-CSCF determines 5G SRVCC is not supported.

If the E-CSCF has determined that one or both of (4G) SRVCC is supported and 5G SRVCC is supported, the E-CSCF may forward the SIP REGISTER towards an EATF, at 606.

At 608, the UE using NG-RAN sends a SIP INVITE request message for IMS emergency to the network. The E-CSCF receives the SIP INVITE request message.

At 610, the E-CSCF sends the received SIP INVITE request message (see step 4) to the EATF. The EATF receives the SIP INVITE request message. The EATF may then act as B2BUA and initiate a new SIP INVITE request, based on the received SIP INVITE, and send the new SIP INVITE request to a PSAP or BGCF. The PSAP or BGCF then sends a SIP response to the EATF in response to receiving the SIP INVITE request.

The EATF forwards the received SIP response to the E-CSCF, at 612.

The E-CSCF sends the received SIP response to the SIP INVITE to the UE, at 614. The UE receives the SIP response to the SIP INVITE request message.

A precondition is that the UE transfers the emergency session from NG-RAN to an E-UTRA connected to EPC (e.g., the UE moves from a 5G coverage area to a 4G coverage area, or the operator directs the UE to move from 5G to 4G due to loading issues). The UE sends the measurement reports to the E-UTRA, and the E-UTRA decides to trigger an PS to CS SRVCC handover to CS access. E-UTRA connected to EPC sends a Handover from E-UTRAN Command message to the UE. The UE receives the Handover from E-UTRAN Command message, at 616.

Figure 7:
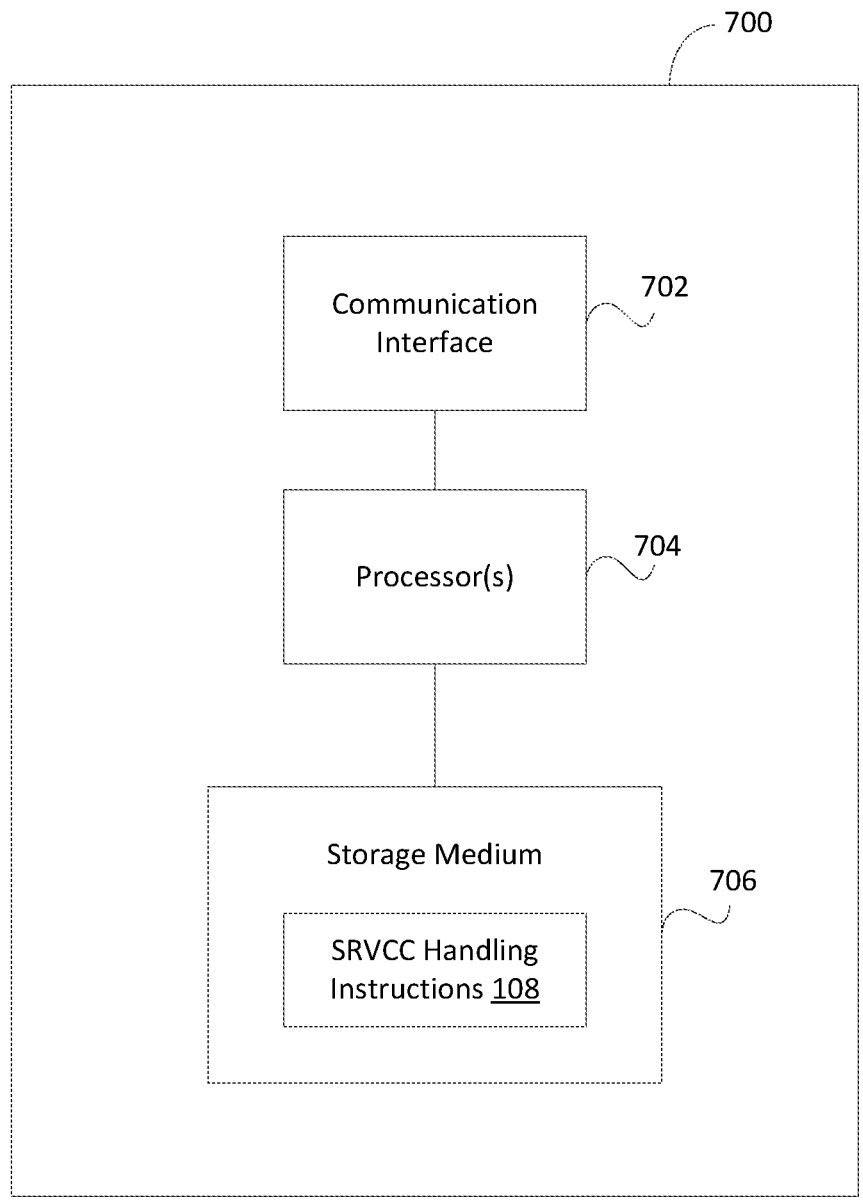
FIG. 7 is a block diagram of an example wireless node, in accordance with example embodiments of the present disclosure.

Reference is made to FIG. 7, which is a block diagram of an example wireless node 700, such as a UE or a network node (in an access network or core network).

The wireless node 700 includes a communication interface 702 to communicate over a communications link. The communication interface 102 can include a wireless interface or a wired interface.

The wireless node 700 further includes one or more hardware processors 704. A hardware processor can include a microprocessor, a core of a multi-core microprocessor, a microcontroller, a programmable integrated circuit, a programmable gate array, a digital signal processor, or another hardware processing circuit.

The wireless node 700 further includes a non-transitory machine-readable or computer-readable storage medium 706 storing machine-readable instructions executable on the one or more hardware processors 704 to perform various tasks. The machine-readable instructions can include SRVCC handling instructions 708 to perform various tasks as discussed herein.

The storage medium 706 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Communication between UE and MME or between UE and AMF

The UE indicates support for one or both of 5G SRVCC and 5G vSRVCC when using E-UTRA connected to EPC in the EPS registration procedures. The EPS registration procedures include the attach procedure with the MME and the tracking area update (TAU) procedure with the MME. When the UE disables support for one or both of 5G SRVCC and 5G vSRVCC, the UE indicates no support for one or both of 5G SRVCC and 5G vSRVCC, respectively, in the EPS registration procedures. The MME receives the indication of support for one or both of 5G SRVCC and 5G vSRVCC from the UE during the EPS registration procedures.

The UE indicates support for one or both of 4G SRVCC and 5G vSRVCC when using NG-RAN connected to 5GC in the 5GS registration procedures. The 5GS registration procedures include the registration procedure with the AMF. When the UE disables support for one or both of 4G SRVCC and 4G vSRVCC, the UE indicates no support for one or both of 4G SRVCC and 4G vSRVCC, respectively, in the 5GS registration procedures. The AMF receives the indication of support for one or both of 4G SRVCC and 4G vSRVCC from the UE during the 5GS registration procedures.

Protocol details (5G)

There are at least two protocol solutions for indicating support for one or both of 4G SRVCC and 4G vSRVCC in the 5GS registration procedures:
Setting one or more bits in the MS network capability IE and include this IE in a 5GS NAS REGISTRATION message; or
Setting one or more bits in the 5GMM capability IE and include this IE in a 5GS NAS REGISTRATION message.

As part of the 5GS registration procedures, the UE sends the (5GS) NAS REGISTRATION message to the network or AMF.

In an embodiment, if the UE supports SRVCC to GERAN or UTRAN, the UE shall set the SRVCC to GERAN/UTRAN capability bit to "SRVCC from UTRAN HSPA or E-UTRAN to GERAN/UTRAN supported" in the:
MS network capability Information Element (IE) of the REGISTRATION REQUEST message; or
5GMM capability IE of the REGISTRATION REQUEST message.

The UE in state 5GMM-REGISTERED shall initiate the registration procedure for mobility and periodic registration update by sending a REGISTRATION REQUEST message to the AMF,
i) when the UE:
supporting 5G-SRVCC from NG-RAN to UTRAN, changes the mobile station classmark 2 or the supported codecs;
no longer supports 5G-SRVCC from NG-RAN to UTRAN;
ii) when the UE supporting SRVCC from E-UTRAN to UTRAN or GERAN no longer supports SRVCC from e-UTRAN to UTRAN or GERAN.
NOTE: When a UE, having indicated support for SRVCC from E-UTRAN to UTRAN or GERAN and support for 5G-SRVCC from NG-RAN to UTRAN, the UE does not need to initiate the registration procedure for mobility and periodic registration update, unless the UE:
no longer supports 5G-SRVCC from NG-RAN to UTRAN; and
no longer supports SRVCC from e-UTRAN to UTRAN or GERAN.

In another embodiment, if the UE supports vSRVCC to UTRAN, the UE shall set the vSRVCC to UTRAN capability bit to "vSRVCC from UTRAN HSPA or E-UTRAN to UTRAN supported" in the:
MS network capability Information Element (IE) of the REGISTRATION REQUEST message; or
5GMM capability IE of the REGISTRATION REQUEST message.

The UE in state 5GMM-REGISTERED shall initiate the registration procedure for mobility and periodic registration update by sending a REGISTRATION REQUEST message to the AMF,
x) when the UE:
supporting 5G-vSRVCC from NG-RAN to UTRAN, changes the mobile station classmark 2 or the supported codecs;
no longer supports 5G-vSRVCC from NG-RAN to UTRAN;
y) when the UE supporting vSRVCC from E-UTRAN to UTRAN no longer supports SRVCC from e-UTRAN to UTRAN.
NOTE: When a UE having indicated support for vSRVCC from E-UTRAN to UTRAN and support for 5G-vSRVCC from NG-RAN to UTRAN, the UE does not need to initiate the registration procedure for mobility and periodic registration update, unless the UE:
no longer supports 5G-vSRVCC from NG-RAN to UTRAN; and
no longer supports vSRVCC from e-UTRAN to UTRAN.

Changes to 3GPP TS 24.008 for Setting One or
More Bits in the MS Network Capability IE of the
NAS REGISTRATION Message 10.5.5.12 MS Network Capability The value part of a MS network capability information element is coded as shown in FIG. 10.5.128/3GPP TS 24.008 and table 10.5.145/3GPP TS 24.008.

| 8 | 7 | 6 | 5 | 4 | 3 | 2 | 1 | |
|---|---|---|---|---|---|---|---|---|
| MS network capability IEI | | | | | | | | octet 1 |
| Length of MS network capability contents | | | | | | | | octet 2 |
| MS network capability value | | | | | | | | octet 3-10 |

FIG. 10.5.128/3GPP TS 24.008 MS Network Capability Information Element

TABLE 10.5.145

| 3GPP TS 24.008 MS network capability information element |
|---|
| <MS network capability value part> ::= <br> ... <br> <EMM Combined procedures Capability: bit> <br> ... <br> <SRVCC to GERAN/UTRAN capability: bit> <br> ... <br> <Spare bits>; <br> EMM Combined procedures capability <br> This information field indicates the support of EMM combined procedures. The MS shall not change this information field from the one that was included in the GMM or EMM ATTACH REQUEST or 5GMM REGISTRATION message. <br>    0 Mobile station does not support EMM combined procedures. <br>    1 Mobile station supports EMM combined procedures <br> SRVCC to GERAN/UTRAN capability <br>    0 SRVCC from UTRAN HSPA or E- UTRAN to GERAN/UTRAN not supported <br>    1 SRVCC from UTRAN HSPA or E-UTRAN to GERAN/UTRAN supported <br> vSRVCC to UTRAN capability <br>    0 SRVCC from UTRAN HSPA or E- UTRAN to UTRAN not supported <br>    1 SRVCC from UTRAN HSPA or E-UTRAN to UTRAN supported |

Changes to 3GPP TS 24.501 for Setting One or
More Bits in the 5GMM Capability IE of the 5GS
NAS REGISTRATION Message 9.11.3.1 5GMM Capability The 5GMM capability information element is coded as shown in FIG. 9.11.3.1.1 and table 9.11.3.1.1.

| 8 | 7 | 6 | 5 | 4 | 3 | 2 | 1 | |
|---|---|---|---|---|---|---|---|---|
| 5GMM capability IEI | | | | | | | | octet 1 |
| Length of 5GMM capability contents | | | | | | | | octet 2 |
| ... | ... | ... | ... | ... | ... | ... | ... | octet 3 |
| ... | ... | ... | 4GvSRVCC | 4G-CSFB | EMMC | 4GSRVCC | ... | octet x* |
| 0 | 0 | 0 | 0 | 0 | 0 | 0 | 0 | octet y*-15* |
| Spare | | | | | | | | |

FIG. 9.11.3.1.1: 5GMM Capability Information Element

TABLE 9.11.3.1.1

| 5GMM capability information element |
|---|
| SRVCC from E-UTRAN to UTRAN or GERAN (4GSRVCC) capability (octet x, bit 2) <br> 0     SRVCC from UTRAN HSPA or E-UTRAN to GERAN or UTRAN not supported |

TABLE 9.11.3.1.1-continued

| 5GMM capability information element |
|---|
| 1     SRVCC from UTRAN HSPA or E-UTRAN to GERAN or UTRAN supported <br> Support of CS fallback procedures (4G-CSFB) (octet x, bit 4) <br> This bit indicates the capability of Support of CSFB procedures. <br> 0     UE does not support CSFB from E-UTRAN to GERAN or UTRAN procedures <br> 1     UE supports CSFB from E-UTRAN to GERAN or UTRAN procedures <br> Support of EMM combined procedures (EMMC) (octet x, bit 3) <br> This bit indicates the capability of Support of EMM combined procedures. The UE shall not change this information field from the one that was included in the GMM or EMM ATTACH REQUEST or 5GMM REGISTATION message. <br> 0     UE does not support EMM combined procedures <br> 1     UE supports EMM combined procedures <br> vSRVCC from E-UTRAN to UTRAN (4GvSRVCC) capability (octet x, bit 5) |

TABLE 9.11.3.1.1-continued

| 5GMM capability information element |
|---|
| 0     vSRVCC from UTRAN HSPA or E-UTRAN to UTRAN not supported <br> 1     vSRVCC from UTRAN HSPA or E-UTRAN to UTRAN supported |

Protocol Details (4G)

There is at least one protocol solution for indicating support for 5G SRVCC ((5G-)SRVCC from NG-RAN to UTRAN) or 5G vSRVCC ((5G-)vSRVCC) in the EPS registration procedures:

Setting one or more bits in the UE network capability IE of the ATTACH or TRACKING AREA UPDATE request message.

As part of the EPS registration procedures, the UE sends the ATTACH or TRACKING AREA UPDATE request message to the network or MME.

In an embodiment, if the UE supports 5G-SRVCC from NG-RAN to UTRAN, the UE shall set the SRVCC to UTRAN capability bit to "SRVCC from NG-RAN to UTRAN supported" in the:

UE network capability IE of the ATTACH or TRACKING AREA UPDATE request message.

The UE in state EMM-REGISTERED shall initiate the tracking area update procedure by sending a TRACKING AREA UPDATE REQUEST message to the MME,
  x) when the UE:
    supporting SRVCC from E-UTRAN to UTRAN or GERAN, changes the mobile station classmark 2 or the supported codecs;
    no longer supports SRVCC from E-UTRAN to UTRAN or GERAN;
  y) when the UE supporting 5G-SRVCC from NG-RAN to UTRAN no longer supports 5G-SRVCC from NG-RAN to UTRAN.
  NOTE: When a UE supporting SRVCC from E-UTRAN to UTRAN or GERAN also supports 5G-SRVCC from NG-RAN to UTRAN, the UE does not need to initiate the tracking area update procedure, unless the UE:
    no longer supports 5G-SRVCC from NG-RAN to UTRAN; and
    no longer supports SRVCC from E-UTRAN to UTRAN or GERAN.

In another embodiment, if the UE supports 5G-vSRVCC from NG-RAN to UTRAN, the UE shall set the vSRVCC to UTRAN capability bit to "vSRVCC from NG-RAN to UTRAN supported" in the:
  UE network capability IE of the ATTACH or TRACKING AREA UPDATE request message.

The UE in state EMM-REGISTERED shall initiate the tracking area update procedure by sending a TRACKING AREA UPDATE REQUEST message to the MME,
  x) when the UE:
    supporting vSRVCC from E-UTRAN to UTRAN, changes the mobile station classmark 2 or the supported codecs;
    no longer supports vSRVCC from E-UTRAN to UTRAN;
  y) when the UE supporting 5G-vSRVCC from NG-RAN to UTRAN no longer supports 5G-vSRVCC from NG-RAN to UTRAN.
  NOTE: When a UE supporting vSRVCC from E-UTRAN to UTRAN also supports 5G-vSRVCC from NG-RAN to UTRAN, the UE does not need to initiate the tracking area update procedure, unless the UE:
    no longer supports 5G-vSRVCC from NG-RAN to UTRAN; and
    no longer supports vSRVCC from E-UTRAN to UTRAN.

Changes to 3GPP TS 24.501 for setting one or more bits in the UE network capability IE of the ATTACH or TRACKING AREA UPDATE request message 9.9.3.34 UE Network Capability The UE network capability information element is coded as shown in FIG. 9.9.3.34.1 and table 9.9.3.34.1.

| 8 | 7 | 6 | 5 | 4 | 3 | 2 | 1 | |
|---|---|---|---|---|---|---|---|---|
| UE network capability IEI | | | | | | | | octet 1 |
| Length of UE network capability contents | | | | | | | | octet 2 |
| ... | ... | ... | ... | ... | ... | ... | ... | octet 3 |
| | | | | | | 5GvS RVCC | 5GS RVCC | octet x* |
| 0 | 0 | 0 | 0 | 0 | 0 | 0 | 0 | octet y*-15* |
| Spare | | | | | | | | |

FIG. 9.9.3.34.1: UE Network Capability Information Element

TABLE 9.9.3.34.1

| UE network capability information element |
|---|
| 5GSRVCC capability (octet x, bit 1) |
| 0   5G-SRVCC from NG-RAN to UTRAN not supported |
| 1   5G-SRVCC from NG-RAN to UTRAN supported (see 3GPP TS 23.216) |
| 5GvSRVCC capability (octet x, bit 2) |
| 0   5G-vSRVCC from NG-RAN to UTRAN not supported |
| 1   5G-vSRVCC from NG-RAN to UTRAN supported (see 3GPP TS 23.216) |

Communication between MME and UDM/HSS and between AMF and UDM/HSS

The MME receives the indication of support for one or both of 5G SRVCC and 5G vSRVCC from the UE during the EPS registration procedures. The MME determines the UE 5G SRVCC capability based on:
  "the indication of support for 5G SRVCC from the UE"; and
  if the MME has information indicating whether SRVCC is possible in a 5GS, the information indicating whether SRVCC is possible in the 5GS.

The MME determines the UE 5G vSRVCC capability based on:
  "the indication of support for 5G vSRVCC from the UE"; and
  if the MME has information indicating whether vSRVCC is possible in a 5GS, the information indicating whether vSRVCC is possible in the 5GS.

Based on the determined UE 5G SRVCC capability, MME indicates UE SRVCC capability to the UDM/HSS. Based on the determined UE 5G vSRVCC capability, the MME indicates UE vSRVCC capability to the UDM/HSS.

The AMF receives the indication of support for one or both of 4G SRVCC and 4G vSRVCC from the UE during the 5GS registration procedures. The AMF determines the UE 4G SRVCC capability based on:
  "the indication of support for 4G SRVCC from the UE"; and
  if the AMF has information indicating whether SRVCC is possible in an EPS, the information indicating whether SRVCC is possible in the EPS.

The AMF determines the UE 4G vSRVCC capability based on:
  "the indication of support for 4G vSRVCC from the UE"; and
  if the AMF has information indicating whether vSRVCC is possible in an EPS, the information indicating whether vSRVCC is possible in the EPS.

Based on the determined UE 4G SRVCC capability, the AMF indicates a UE SRVCC capability to the UDM/HSS via the Nudm_UEContextManagement service. Based on the determined UE 4G vSRVCC capability, the AMF indicates a UE vSRVCC capability to the UDM/HSS via the Nudm_UEContextManagement service.

Upon receipt of a UE SRVCC capability, the UDM/HSS either stores a single instance of the UE SRVCC capability or separate instances of the UE SRVCC capability. If the UDM/HSS stores separate instances of the UE SRVCC capability, the UDM/HSS can store:

5G UE SRVCC capability
4G UE SRVCC capability

Or the UDM/HSS can store, along with a time stamp indicating the time of receipt:

5G UE SRVCC capability received over NG-RAN
4G UE SRVCC capability received over E-UTRA connected to EPC
5G UE SRVCC capability received over E-UTRA connected to EPC
4G UE SRVCC capability received over NG-RAN Upon receipt of a UE vSRVCC capability, the UDM/HSS either stores a single instance of the UE vSRVCC capability or separate instances of the UE vSRVCC capability. If the UDM/HSS stores separate instances of the UE vSRVCC capability, the UDM/HSS can store:

5G UE vSRVCC capability
4G UE vSRVCC capability

Or the UDM/HSS can store, along with a time stamp indicating the time of receipt:

5G UE vSRVCC capability received over NG-RAN
4G UE vSRVCC capability received over E-UTRA connected to EPC
5G UE vSRVCC capability received over E-UTRA connected to EPC
4G UE vSRVCC capability received over NG-RAN Protocol Details (5G)

In an embodiment, the API (application program interface) of the Nudm_UEContextManagement service includes the Amf3GppAccessRegistration type.

TABLE 6.2.6.2.2-1

Definition of type Amf3GppAccessRegistration

| Attribute name | Data type | P | Cardinality | Description |
|---|---|---|---|---|
| . . . | . . . | . . . | . . . | . . . |
| ueSRVCCCapability | boolean | O | 0 . . . 1 | This IE indicates whether the UE supports 5G SRVCC or (4G) SRVCC: true: 5G SRVCC is supported by the UE and AMF or (4G) SRVCC is supported by the UE; false, or absence of this attribute: 5G SRVCC is not supported and (4G) SRVCC is not supported by the UE. See NOTE 1. |
| uevSRVCCCapability | boolean | O | 0 . . . 1 | This IE indicates whether the UE supports 5G vSRVCC or (4G) vSRVCC: true: 5G vSRVCC is supported by the UE and AMF or (4G) vSRVCC is supported by the UE; false, or absence of this attribute: 5G vSRVCC is not supported and (4G) vSRVCC is not supported by the UE. See NOTE 2. |

NOTE 1:
If the AMF knows whether the EPC supported (4G) SRVCC, the AMF can take this into account when setting the ueSRVCCCapability attribute.
NOTE 2:
If the AMF knows whether the EPC supported (4G) vSRVCC, the AMF can take this into account when setting the uevSRVCCCapability attribute.

Protocol details (4G)

In an embodiment, the Location Management Procedures are used to update location information in the HSS. They are used by certain network entities (e.g. MME, SGSN), to provide the HSS with data e.g. user data, such as UE SRVCC Capability or UE vSRVCC Capability. This procedure can be mapped to the commands Update-Location-Request (ULR) in a Diameter protocol application.

Table 5.2.1.1.1/1 specifies the involved information elements for the request.

TABLE 5.2.1.1.1/1

Update Location Request

| Information element name | Mapping to Diameter AVP | Cat. | Description |
|---|---|---|---|
| . . . | . . . | . . . | . . . |
| UE SRVCC Capability | UE-SRVCC-Capability | C | This information element shall indicate if the UE supports or does not support the SRVCC capability or the 5G SRVCC capability. This IE may be present if: the MME or the SGSN supports SRVCC and this information is available to the MME or the SGSN; the HSS is a HSS + UDM (collocated HSS and UDM). |

TABLE 5.2.1.1.1/1-continued

Update Location Request

| Information element name | Mapping to Diameter AVP | Cat. | Description |
| --- | --- | --- | --- |
| UE vSRVCC Capability | UE-vSRVCC-Capability | C | This information element shall indicate if the UE supports or does not support the vSRVCC capability or the 5G vSRVCC capability. This IE may be present if: the MME or the SGSN supports vSRVCC and this information is available to the MME or the SGSN; the HSS is a HSS + UDM (collocated HSS and UDM). |
| ... | ... | ... ... | |

A Notification Procedure shall be used between the MME and the HSS and between the SGSN and the HSS when an inter MME or SGSN location update does not occur but the HSS needs to be notified about one or more of:
- an update of UE information;
- an update of the UE SRVCC capability (only if the MME/SGSN supports SRVCC or an AMF supports 5G-SRVCC); and
- an update of the UE vSRVCC capability (only if the MME/SGSN supports vSRVCC or an AMF supports 5G-vSRVCC)

TABLE 5.2.5.1.1/1

Notify Request

| Information element name | Mapping to Diameter AVP | Cat. | Description |
| --- | --- | --- | --- |
| ... | ... | ... ... | |
| UE SRVCC Capability | UE-SRVCC-Capability | C | This information element shall indicate if the UE supports or does not support the SRVCC capability or 5G SRVCC capability. If the MME/SGSN supports SRVCC or the HSS is a HSS + UDM (collocated HSS and UDM) and the UE SRVCC Capability has changed, the MME or SGSN shall include the new UE SRVCC Capability in the request. |
| UE vSRVCC Capability | UE-vSRVCC-Capability | C | This information element shall indicate if the UE supports or does not support the vSRVCC capability or 5G vSRVCC capability. If the MME/SGSN supports vSRVCC or the HSS is a HSS + UDM (collocated HSS and UDM) and the UE vSRVCC Capability has changed, the MME or SGSN shall include the new UE vSRVCC Capability in the request. |
| ... | ... | ... ... | |

The UE-SRVCC-Capability AVP can take the following values:

7.3.130 UE-SRVCC-Capability

The UE-SRVCC-Capability AVP is of type Enumerated. It shall indicate if the UE supports or does not support the SRVCC capability or the 5G SRVCC capability. The following values are defined:

UE-SRVCC-NOT-SUPPORTED (0)
UE-SRVCC-SUPPORTED (1)

The UE-SRVCC-Capability AVP can take the following values:

7.3.131 UE-vSRVCC-Capability

The UE-vSRVCC-Capability AVP is of type Enumerated. It shall indicate if the UE supports or does not support the vSRVCC capability or the 5G vSRVCC capability. The following values are defined:

UE-vSRVCC-NOT-SUPPORTED (0)
UE-vSRVCC-SUPPORTED (1)

Communication Between SCC AS and UDM/HSS

The SCC AS communicates using Sh interface with the UDM/HSS. The SSC AS receives from the HSS/UDM one or both of the UE SRVCC capability or the UE vSRVCC capability. The UE SRVCC capability may be called "UE PS to CS SRVCC capability" and the UE vSRVCC capability may be called "UE PS to CS vSRVCC capability". The UE SRVCC capability may have the value UE-SRVCC-CAPABILITY-SUPPORTED or the UE SRVCC capability may have the value UE-VSRVCC-CAPABILITY-SUPPORTED. The SCC AS further obtains the C-MSISDN from UDM/HSS.

Communication Between SCC AS and ATCF

If the UE SRVCC capability indicates SRVCC is possible or the UE VSRVCC capability indicates that vSRVCC is possible, then the SCC AS invokes the ATCF during SIP registration. The SCC AS informs the ATCF of the C-MSISDN. The C-MSISDN is used to correlate a request from a network element supporting CS services (e.g. MSC) with a session anchored in the IMS.

The SCC AS indicates to the SC UE that a session is anchored in the SCC AS by including the "g.3gpp.SRVCC"

feature capability indicator in the Feature-Caps header field of an initial SIP INVITE request and in a SIP 1xx response or SIP 2xx response to an initial SIP INVITE request towards the SC UE.

Communication Between SCC AS and UE

If the UE SRVCC capability indicates SRVCC is possible or the UE VSRVCC capability indicates that vSRVCC is possible, then the SCC AS indicates to the UE that a session is anchored in the SCC AS by including the "g.3gpp.SRVCC" feature capability indicator in the Feature-Caps header field of an initial SIP INVITE request and in a SIP 1xx response or SIP 2xx response to an initial SIP INVITE request towards the UE.

This means the following line may be added to the initial SIP INVITE request or in the SIP 1xx response or SIP 2xx response:

---
Feature-Caps: *;+g.3gpp.SRVCC
---

This means the UE will receive an initial SIP INVITE request or a SIP 1xx response or SIP 2xx response, the SIP request or response including the "g.3gpp.SRVCC" feature capability indicator in the Feature-Caps header field.

SRVCC for Emergency Calls

For the purposes of emergency calls with a serving PLMN:
  A UE capable of IMS emergency calls and 4G-SRVCC shall include the indicator indicating support for SRVCC from E-UTRAN to UTRAN or GERAN during the 5GS registration procedures with the AMF. Refer to step 1 in FIG. 6.0.1-1 in subclause 6.0.2 of this document.
  A UE capable of IMS emergency calls and 5G-SRVCC shall include the indicator indicating support for 5G SRVCC ((5G-)SRVCC from NG-RAN to UTRAN) during the EPS registration procedures with the MME. Refer to step 1 in FIG. 6.0.2-1 in subclause 6.0.2 of this document.
In addition, when a UE capable of IMS emergency calls and one or both of 4G-SRVCC and 5G-SRVCC:
  sends a SIP REGISTER request message to the network, the SIP REGISTER includes an indication indicating that it is for an emergency registration attempt; or
  sends a SIP INVITE request message (following the SIP REGISTER request message) to the network, the SIP INVITE includes an indicator indicating emergency.
  The indicator indicating emergency includes a string of "sos". The SIP session created by the sending of the SIP INVITE is anchored at an EATF (Emergency Access Transfer Function) in the serving PLMN.

Communication between UE and MME and between UE and AMF

Protocol Details (5G)

The same protocol solutions as for 4G SRVCC as described above apply for emergency calls initiated by a registered user/subscriber.

Protocol Details (4G)

The same protocol solutions as for 5G SRVCC as described above apply for emergency calls initiated by a registered user/subscriber.

CSFB Preparation When Registering Over 5G RAN with 5G CN

The UE (i.e. mobile station (MS), for the purposes of this document) indicates support for a fallback type when using NG-RAN connected to 5GC in the 5GS registration procedures. When indicating support for the fallback type, the UE indicates support for evolved mobility management (EMM) combined procedures (e.g. combined attach procedure and combined tracking area update procedure). The 5GS registration procedures include the registration procedure with the AMF. When the UE disables support for support for EMM combined procedures, the UE indicates the UE does not support EMM combined procedures. The AMF receives the indication of support for EMM combined procedures or lack thereof from the UE during the 5GS registration procedures.

In certain deployments, the AMF may take UE's indication of support for EMM combined procedures into account when indicating Emergency Service(s) Fallback support to the UE (e.g. if a specific PLMN provides Emergency services over CS domain). If the AMF takes UE's indication of support for EMM combined procedures into account (e.g. the PLMN provides Emergency services over CS domain), the AMF indicates in the response to the registration request part of the 5GS registration procedures that emergency service fall back is supported. If, subsequently, the UE detects a need for obtaining emergency services (e.g. by detecting an emergency number being dialed), the UE may be informed (by the 5GS) as part of the request for emergency services fallback, to perform a system fallback. The UE then performs EMM combined procedures with the EPC. Subsequent to performing EMM combined procedures with the EPC, the UE performs CSFB. Subsequent to performing CSFB, the UE transmits/sends to the network either a SETUP request message or a EMERGENCY SETUP request message using the CS domain.

Protocol Details (5G)

There are at least two protocol solutions for indicating support for EMM combined procedures in the 5GS registration procedures:
  Setting a bit in the MS network capability IE of the 5G NAS REGISTRATION message; or
  Setting a bit in the 5GMM capability IE of the 5G NAS REGISTRATION message.
As part of the 5GS registration procedures, the UE sends the (5GS) NAS REGISTRATION message to the network or AMF.

In an embodiment, if the UE supports EMM combined procedures, the UE shall set the EMM combined procedures capability bit to UE or MS supports EMM combined procedures in the:
  MS network capability Information Element (IE) of the REGISTRATION REQUEST message (send to the AMF); or
  5GMM capability IE of the REGISTRATION REQUEST message (send to the AMF).
In another embodiment, if the UE supports CS fallback as specified in 3GPP TS 24.301, the UE shall set the CSFB capability bit to "UE supports CSFB from E-UTRAN to GERAN or UTRAN procedures" in the 5GMM capability IE of the REGISTRATION REQUEST message (send to the AMF).

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method implemented by a network node, the method comprising:
   receiving, from a user equipment (UE), a session initiation protocol (SIP) registration request; and
   in response to receiving the SIP registration request:
      obtaining non-access stratum (NAS) registration state information associated with the UE from a first core network node, the NAS registration state information indicating at least one of fourth-generation (4G) single radio voice call continuity (SRVCC) capability of the UE or fifth-generation (5G) SRVCC capability of the UE that is applicable when using a second access network supported by a second core network, wherein the UE is registered with a first IP Multimedia Subsystem (IMS) network that includes the network node using a SIP via the second access network supported by the second core network; and
      providing, to a second IMS network node, an indication of a single UE SRVCC capability for the UE.

2. The method of claim 1, wherein the first core network node comprises a home subscriber server (HSS).

3. The method of claim 1, wherein the second core network comprises a 5G core network.

4. The method of claim 1, wherein the network node comprises an IMS service centralization and continuity application server (SCC AS).

5. The method of claim 1, wherein the second IMS network node comprises an access transfer control function (ATCF) node.

6. The method of claim 1, wherein the second IMS network node is in a second IMS network.

7. The method of claim 1, wherein providing the indication of a single UE SRVCC capability for the UE comprises sending, to the second IMS network node, a SIP message request containing SRVCC information.

8. The method of claim 1, wherein the 4G UE SRVCC capability comprises a UE packet-switched (PS) to circuit-switched (CS) SRVCC capability.

9. A computing device implementing a network node, the computing device comprising:
   a processor; and
   a memory coupled to the processor, the memory storing instructions that, when executed, configure the processor to:
      receive, from a user equipment (UE), a session initiation protocol (SIP) registration request; and
      in response to receiving the SIP registration request:
         obtain non-access stratum (NAS) registration state information associated with the UE from a first core network node, the NAS registration state information indicating at least one of fourth-generation (4G) single radio voice call continuity (SRVCC) capability of the UE or fifth-generation (5G) SRVCC capability of the UE that is applicable when using a second access network supported by a second core network, wherein the UE is registered with a first IP Multimedia Subsystem (IMS) network that includes the network node using a SIP via the second access network supported by the second core network; and
         provide, to a second IMS network node, an indication of a single UE SRVCC capability for the UE.

10. The computing device of claim 9, wherein the first core network node comprises a home subscriber server (HSS).

11. The computing device of claim 9, wherein the second core network comprises a 5G core network.

12. The computing device of claim 9, wherein the network node comprises an IMS service centralization and continuity application server (SCC AS).

13. The computing device of claim 9, wherein the second IMS network node comprises an access transfer control function (ATCF) node.

14. A server-implemented method, comprising:
   receiving a request from an IP Multimedia Subsystem (IMS) network node of an IMS network; and
   in response to receiving the request, providing NAS registration state information associated with a user equipment (UE) to the IMS network node, the NAS registration state information indicating at least one of fourth-generation (4G) single radio voice call continuity (SRVCC) capability of the UE or fifth-generation (5G) SRVCC capability of the UE that is applicable when using an access network supported by a core network, wherein the server is configured to store separate instances of UE SRVCC capabilities, the separate instances including indications of at least one of 4G UE SRVCC capability or 5G UE SRVCC capability that is applicable when using the access network supported by the core network, and wherein the UE is registered with the IMS network using a session initiation protocol (SIP) via the access network.

15. The method of claim 14, wherein the NAS registration state information indicates both 4G UE SRVCC capability and 5G UE SRVCC capability.

16. The method of claim 14, wherein the access network comprises one of: a network supported by a $3^{rd}$ Generation Partnership Project (3GPP) core network, a Next Generation Radio Access Network (NG-RAN) supported by a 5G core network, or an Evolved Universal Mobile Telecommunications System (UMTS) Terrestrial Radio Access supported by an Evolved Packet Core (EPC) network.

17. The method of claim 14, wherein the IMS network node comprises an IMS service centralization and continuity application server (SCC AS), and wherein the NAS registration state information is provided via a Sh interface associated with the IMS network node.

18. The method of claim 14, wherein the 4G UE SRVCC capability comprises a UE packet-switched (PS) to circuit-switched (CS) SRVCC capability.

19. The method of claim 14, wherein the server comprises at least one of a home subscriber server (HSS) and unified data management (UDM).

20. The method of claim 19, wherein the server comprises the HSS and a collocated UDM.

* * * * *